United States Patent
Zhong

(10) Patent No.: US 12,164,042 B2
(45) Date of Patent: Dec. 10, 2024

(54) EXERCISE TRACK RECORDING METHOD AND RELATED DEVICE

(71) Applicant: HUAWEI TECHNOLOGIES CO., LTD., Guangdong (CN)

(72) Inventor: Zhen Zhong, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 429 days.

(21) Appl. No.: 17/435,498

(22) PCT Filed: May 26, 2020

(86) PCT No.: PCT/CN2020/092322
§ 371 (c)(1),
(2) Date: Sep. 1, 2021

(87) PCT Pub. No.: WO2020/238894
PCT Pub. Date: Dec. 3, 2020

(65) Prior Publication Data
US 2022/0137232 A1    May 5, 2022

(30) Foreign Application Priority Data

May 28, 2019 (CN) .......................... 201910452140.5
May 31, 2019 (CN) .......................... 201910473286.8

(51) Int. Cl.
*G01S 19/19* (2010.01)
*G01S 19/39* (2010.01)
(Continued)

(52) U.S. Cl.
CPC ............ *G01S 19/19* (2013.01); *G01S 19/393* (2019.08); *G01S 19/34* (2013.01); *G01S 19/42* (2013.01); *G01S 19/426* (2013.01)

(58) Field of Classification Search
CPC ........ G01S 19/19; G01S 19/393; G01S 19/42; G01S 19/34; G01S 19/426; H04W 52/0254
(Continued)

(56) References Cited

U.S. PATENT DOCUMENTS

| 7,057,551 | B1* | 6/2006 | Vogt ........................ G01S 19/19 |
| | | | 701/472 |
| 9,121,935 | B2* | 9/2015 | Park ...................... G01S 19/258 |
| 9,128,180 | B2* | 9/2015 | Saha ..................... G06F 1/3206 |
| 9,351,255 | B2* | 5/2016 | Nakao ............... H04W 52/0254 |
| 9,658,338 | B2* | 5/2017 | Mole ....................... G01S 19/52 |

(Continued)

FOREIGN PATENT DOCUMENTS

| CN | 101097252 A | 1/2008 |
| CN | 103269510 A | 8/2013 |

(Continued)

OTHER PUBLICATIONS

Wsmysyn, [Turn] Stanford startup magic algorithm, the GPS + PDR power consumption reduced by five times [copy ink], http://bbs.eeworld.com.cn/thread-471644-1-1.html, Aug. 17, 2015, 6 pages.

(Continued)

*Primary Examiner* — Chuong P Nguyen
(74) *Attorney, Agent, or Firm* — Gregg Jansen

(57) ABSTRACT

An exercise track recording method and a related device are provided. The exercise track recording method includes: recording, by an electronic device, an exercise track in a first mode (S102); recording the exercise track in a second mode when a first condition is met (S103); and when a second condition is met, sending stored processed GPS data of at least two location points to an application processor, and recording the exercise track in the first mode (S104). According to the method, the application processor can enter a sleep state when the exercise track is recorded in the second mode, to reduce power consumption.

20 Claims, 10 Drawing Sheets

(51) Int. Cl.
G01S 19/34 (2010.01)
G01S 19/42 (2010.01)

(58) Field of Classification Search
USPC .................. 342/357.57, 357.25, 357.74
See application file for complete search history.

(56) References Cited

U.S. PATENT DOCUMENTS

| | | | | |
|---|---|---|---|---|
| 9,989,648 | B2* | 6/2018 | Tomii | G01S 19/34 |
| 10,560,898 | B1* | 2/2020 | Tham | G01S 5/019 |
| 11,029,414 | B2* | 6/2021 | Hsieh | G01C 21/14 |
| 2011/0175772 | A1* | 7/2011 | Sambongi | G01S 19/258 |
| | | | | 342/357.3 |
| 2013/0244686 | A1 | 9/2013 | Saha et al. | |
| 2015/0138014 | A1* | 5/2015 | Park | G01S 19/14 |
| | | | | 342/357.66 |
| 2016/0025863 | A1 | 1/2016 | Lau et al. | |
| 2016/0269868 | A1* | 9/2016 | Su | G16H 40/67 |
| 2017/0153313 | A1 | 6/2017 | Tsai et al. | |
| 2023/0266481 | A1* | 8/2023 | Terashima | G01S 19/42 |
| | | | | 342/357.21 |

FOREIGN PATENT DOCUMENTS

| | | | | |
|---|---|---|---|---|
| CN | 104995581 | A | | 10/2015 |
| CN | 105451328 | A | | 3/2016 |
| CN | 105764125 | A | | 7/2016 |
| CN | 105872976 | A | | 8/2016 |
| JP | H0744485 | A | | 2/1995 |
| JP | 2010085355 | A | | 4/2010 |
| JP | 2012108001 | A | | 6/2012 |
| JP | 2012145465 | A | | 8/2012 |
| JP | 2016167799 | A | | 9/2016 |
| JP | 2016175227 | A | | 10/2016 |
| KR | 20230001649 | A * | 1/2023 | ............. G01S 19/19 |

OTHER PUBLICATIONS

NMEA,baidubaike, https://baike.baidu.com/item/NMEA/9812575?fr=aladdin, 2007, 5 pages.

Avenue to jane, A Brief Analysis of the Basic Principles of AGPS Positioning, https://blog.csdn.net/hiuyong_10086/article/details/51378520, May 11, 2016, 10 pages.

* cited by examiner

EXERCISE TRACK RECORDING METHOD AND RELATED DEVICE

CROSS-REFERENCE TO RELATED APPLICATIONS

This application is a National Stage of International Application No. PCT/CN2020/092322, filed on May 26, 2020, which claims priority to Chinese Patent Application No. 201910452140.5, filed on May 28, 2019 and Chinese Patent Application No. 201910473286.8, filed on May 31, 2019. All of the aforementioned applications are hereby incorporated by reference in their entireties.

TECHNICAL FIELD

This application relates to the field of electronic device technologies, and in particular, to an exercise track recording method and a related device.

BACKGROUND

During running, a user usually records an exercise track by using exercise-related software installed on a mobile phone, for example, a Huawei Health application (application, APP). In an exercise track recording process, a global positioning system (global positioning system, GPS) chip of the mobile phone needs to send one piece of GPS data to an application processor (application processor, AP) every second, so that the application processor processes the GPS data after receiving the data, sends processed data to an upper-layer app, and updates a location on a map in the app. Therefore, the user can view the exercise track of the user on the map. However, this manner causes high power consumption and short battery endurance of the mobile phone.

SUMMARY

Embodiments of this application provide an exercise track recording method and a related device, to reduce power consumption and improve battery endurance of an electronic device in an exercise track recording process.

According to a first aspect, an embodiment of this application provides an electronic device, including a touch sensor, a micro control unit MCU, and a global positioning system GPS chip. The GPS chip is configured to obtain GPS data of a current location of the electronic device. An application processor is connected to the GPS chip, and is configured to: receive the GPS data sent by the GPS chip, and process the GPS data by using a first positioning algorithm. The MCU is connected to the GPS chip, and is configured to: when a first condition is met, receive the GPS data sent by the GPS chip, process the GPS data by using a second positioning algorithm, and store processed GPS data of at least two location points. The MCU is further connected to the application processor, and is configured to send the processed GPS data of the at least two location points to the application processor when a second condition is met.

Specifically, one piece of GPS data is longitude and latitude corresponding to one location point.

The electronic device provided in this embodiment of this application may receive, by using the MCU, a plurality of pieces of GPS data reported by the GPS chip, and the MCU may process the plurality of pieces of GPS data by using the first positioning algorithm, and then report a plurality of pieces of processed GPS data to the application processor in batches, so that the application processor does not need to remain in a wake-up state in an exercise track recording process. In other words, the application processor may be in a sleep state in the exercise track recording process. This reduces power consumption in the exercise track recording process, and improves battery endurance of the electronic device. In addition, the solution provided in this embodiment of this application may be applied to all electronic devices having an MCU, and therefore has a wide application scope.

In a possible implementation, the electronic device further includes a display, and the first condition is that the display is off.

Specifically, in this implementation, the MCU may determine whether the first condition is met, or the application processor may determine whether the first condition is met.

In this application, when the electronic device is screen-off, the electronic device may receive, by using the MCU, the plurality of pieces of GPS data reported by the GPS chip, and the MCU may process the plurality of pieces of GPS data by using the first positioning algorithm, and then report the plurality of pieces of processed GPS data to the application processor in batches. A user does not have a requirement for viewing an exercise track in real time in a process in which the electronic device is screen-off. In this case, the application processor can enter the sleep state when the electronic device is screen-off. Therefore, power consumption of the electronic device is reduced.

In another possible implementation, the first condition is that duration for which the MCU has sent the processed GPS data of the at least two location points to the application processor has reached A seconds, and sending the processed GPS data of the at least two location points is completed, where A is a positive integer.

Specifically, in this implementation, the MCU may determine whether the first condition is met. A seconds are set, so that the application processor has sufficient time to perform second processing on the GPS data. The second processing includes noise reduction and smoothing processing performed on the GPS data sent by the MCU to the application processor.

In another possible implementation, the electronic device further includes a display; and the first condition is that the display is off, sending the processed GPS data of the at least two location points is completed, and processing the processed GPS data of the at least two location points by the application processor is completed.

Specifically, in this implementation, the application processor may determine whether the first condition is met.

In another possible implementation, the electronic device further includes a display, and the second condition is any one of the following: the processed GPS data of the at least two location points reaches a threshold, it is determined, based on the processed GPS data of the at least two location points, that a next-time wake-up condition of the application processor is met, and the display is on.

Possibly, that the processed GPS data of the at least two location points reaches a threshold includes: memory occupied by the processed GPS data of the at least two location points reaches the threshold.

Specifically, the threshold of the memory may be but is not limited to 10 kb, 20 kb, 25 kb, or the like.

Possibly, that the processed GPS data of the at least two location points reaches a threshold includes: duration for storing the processed GPS data of the at least two location points reaches the threshold.

Specifically, the threshold of the duration may be but is not limited to 1 minute, 3 minutes, 5 minutes, or the like.

In another possible implementation, the next-time wake-up condition of the application processor is determined based on a voice broadcast condition set by a user.

Possibly, the voice broadcast condition set by the user is that broadcast is performed at a fixed exercise distance interval, and the next-time wake-up condition of the application processor is that a difference between a current exercise distance and an exercise distance for next voice broadcast is a first distance, where the exercise distance for the next voice broadcast is longer than the current exercise distance.

Specifically, the first distance may be, for example, but is not limited to 0.05 km, 0.1 km, or 0.2 km.

Possibly, the voice broadcast condition set by the user is that broadcast is performed at a fixed time interval, and the next-time wake-up condition of the application processor is that a difference between a current moment and a moment for next voice broadcast is first duration, where the moment for the next voice broadcast is later than the current moment.

Specifically, the first duration may be but is not limited to 5 seconds, 10 seconds, or the like.

In this embodiment of this application, in the exercise track recording process, the voice broadcast is used as a condition for waking up the application processor, to ensure that the application processor is woken up in advance to perform the voice broadcast in time. This does not affect normal use by the user, but also reduces power consumption of the electronic device and improves user experience.

In another possible implementation, memory occupied by the first positioning algorithm is greater than memory occupied by the second positioning algorithm.

Specifically, the first positioning algorithm may include the following several features: Kalman filtering, a least square method, a satellite location, ephemeris resolution, an assisted global positioning system (Assisted Global Positioning System, AGPS), and a National Marine Electronics Association (National Marine Electronics Association, NMEA) protocol.

Specifically, the second positioning algorithm may include the following several features: Kalman filtering, a least square method, and a satellite location.

The second positioning algorithm provided in this embodiment of this application is stored in the MCU, and can save storage space in the MCU compared with the first positioning algorithm. In addition, accuracy for processing the GPS data can be ensured by using the second positioning algorithm, to ensure that an accurate track is recorded and presented to the user.

According to a second aspect, an embodiment of this application provides a micro control unit MCU, including a processing module, a storage module, and a transceiver module. The storage module and the transceiver module are coupled to the processing module. The storage module is configured to store computer program code, the computer program code includes computer instructions, and when one or more processing modules execute the computer instructions, the MCU performs the following: receiving, via the transceiver module, GPS data sent by a GPS chip; processing the GPS data via the processing module by using a positioning algorithm; storing processed GPS data of at least two location points into the storage module; and when a condition is met, sending, via the transceiver module, the processed GPS data of the at least two location points to an application processor.

Specifically, the one piece of GPS data is longitude and latitude corresponding to one location point.

The MCU provided in this embodiment of this application may receive a plurality of pieces of GPS data reported by the GPS chip, and the MCU may process the plurality of pieces of GPS data by using the positioning algorithm, and then report a plurality of pieces of processed GPS data to the application processor in batches, so that the application processor does not need to remain in a wake-up state in an exercise track recording process. In other words, the application processor may be in a sleep state in the exercise track recording process. This reduces power consumption in the exercise track recording process, and improves battery endurance of an electronic device.

In a possible implementation, the condition is any one of the following: the processed GPS data of the at least two location points reaches a threshold, and it is determined, based on the processed GPS data of the at least two location points, that a next-time wake-up condition of the application processor is met.

Possibly, that the processed GPS data of the at least two location points reaches a threshold includes: memory occupied by the processed GPS data of the at least two location points reaches the threshold.

Specifically, the threshold of the memory may be but is not limited to 10 kb, 20 kb, 25 kb, or the like.

Possibly, that the processed GPS data of the at least two location points reaches a threshold includes: duration for storing the processed GPS data of the at least two location points reaches the threshold.

Specifically, the threshold of the duration may be but is not limited to 1 minute, 3 minutes, 5 minutes, or the like.

In another possible implementation, the next-time wake-up condition of the application processor is determined based on a voice broadcast condition set by a user.

Possibly, the voice broadcast condition set by the user is that broadcast is performed at a fixed exercise distance interval, and the next-time wake-up condition of the application processor is that a difference between a current exercise distance and an exercise distance for next voice broadcast is a first distance, where the exercise distance for the next voice broadcast is longer than the current exercise distance.

Specifically, the first distance may be, for example, but is not limited to 0.05 km, 0.1 km, or 0.2 km.

Possibly, the voice broadcast condition set by the user is that broadcast is performed at a fixed time interval, and the next-time wake-up condition of the application processor is that a difference between a current moment and a moment for next voice broadcast is first duration, where the moment for the next voice broadcast is later than the current moment.

Specifically, the first duration may be but is not limited to 5 seconds, 10 seconds, or the like.

In this embodiment of this application, in the exercise track recording process, the voice broadcast is used as a condition for waking up the application processor, to ensure that the application processor is woken up in advance to perform the voice broadcast in time. This does not affect normal use by the user, but also reduces power consumption of the electronic device and improves user experience.

According to a third aspect, an embodiment of this application provides an exercise track recording method. The method is applied to an electronic device, and the electronic device includes an application processor, a micro control unit MCU, and a global positioning system GPS chip. The method includes: recording, by the electronic device, an exercise track in a first mode, where the first mode is that the GPS chip is connected to the application processor and sends GPS data obtained by the GPS chip to the application processor, and the application processor processes the GPS data by using a first positioning algorithm; recording, by the electronic device, the exercise track in a second mode when a first condition is met, where the second mode is that the GPS chip is connected to the MCU and sends the GPS data obtained by the GPS chip to the MCU, and the MCU processes the GPS data by using a second positioning algorithm and stores processed GPS data of at least two location points; and when a second condition is met, sending, by the MCU, the stored processed GPS data of the at least two location points to the application processor, and the electronic device records the exercise track in the first mode.

Specifically, the one piece of GPS data is longitude and latitude corresponding to one location point.

In the exercise track recording method provided in this embodiment of this application, the MCU may receive a plurality of pieces of GPS data reported by the GPS chip, and the MCU may process the plurality of pieces of GPS data by using the first positioning algorithm, and then report a plurality of pieces of processed GPS data to the application processor in batches, so that the application processor does not need to remain in a wake-up state in an exercise track recording process. In other words, the application processor may be in a sleep state in the exercise track recording process. This reduces power consumption in the exercise track recording process, and improves battery endurance of the electronic device. In addition, the solution provided in this embodiment of this application may be applied to all electronic devices having an MCU, and therefore has a wide application scope.

In a possible implementation, the electronic device further includes a display, and the first condition is that the display is off.

Specifically, in this implementation, the MCU may determine whether the first condition is met, or the application processor may determine whether the first condition is met.

In this application, when the electronic device is screen-off, the electronic device may receive, by using the MCU, the plurality of pieces of GPS data reported by the GPS chip, and the MCU may process the plurality of pieces of GPS data by using the first positioning algorithm, and then report the plurality of pieces of processed GPS data to the application processor in batches. A user does not have a requirement for viewing an exercise track in real time in a process in which the electronic device is screen-off. In this case, the application processor can enter the sleep state when the electronic device is screen-off. Therefore, power consumption of the electronic device is reduced.

In another possible implementation, the first condition is that duration for which the MCU has sent the processed GPS data of the at least two location points to the application processor has reached A seconds, and sending the processed GPS data of the at least two location points is completed, where A is a positive integer.

Specifically, in this implementation, the MCU may determine whether the first condition is met. A seconds are set, so that the application processor has sufficient time to perform second processing on the GPS data. The second processing includes noise reduction and smoothing processing performed on the GPS data sent by the MCU to the application processor.

In another possible implementation, the electronic device further includes a display; and the first condition is that the display is off, sending the processed GPS data of the at least two location points is completed, and processing the processed GPS data of the at least two location points by the application processor is completed.

Specifically, in this implementation, the application processor may determine whether the first condition is met.

In another possible implementation, the electronic device further includes a display, and the second condition is any one of the following: the processed GPS data of the at least two location points reaches a threshold, it is determined, based on the processed GPS data of the at least two location points, that a next-time wake-up condition of the application processor is met, and the display is on.

Possibly, that the processed GPS data of the at least two location points reaches a threshold includes: memory occupied by the processed GPS data of the at least two location points reaches the threshold.

Specifically, the threshold of the memory may be but is not limited to 10 kb, 20 kb, 25 kb, or the like.

Possibly, that the processed GPS data of the at least two location points reaches a threshold includes: duration for storing the processed GPS data of the at least two location points reaches the threshold.

Specifically, the threshold of the duration may be but is not limited to 1 minute, 3 minutes, 5 minutes, or the like.

In another possible implementation, the next-time wake-up condition of the application processor is determined based on a voice broadcast condition set by a user.

Possibly, the voice broadcast condition set by the user is that broadcast is performed at a fixed exercise distance interval, and the next-time wake-up condition of the application processor is that a difference between a current exercise distance and an exercise distance for next voice broadcast is a first distance, where the exercise distance for the next voice broadcast is longer than the current exercise distance.

Specifically, the first distance may be, for example, but is not limited to 0.05 km, 0.1 km, or 0.2 km.

Possibly, the voice broadcast condition set by the user is that broadcast is performed at a fixed time interval, and the next-time wake-up condition of the application processor is that a difference between a current moment and a moment for next voice broadcast is first duration, where the moment for the next voice broadcast is later than the current moment.

Specifically, the first duration may be but is not limited to 5 seconds, 10 seconds, or the like.

In this embodiment of this application, in the exercise track recording process, the voice broadcast is used as a condition for waking up the application processor, to ensure that the application processor is woken up in advance to perform the voice broadcast in time. This does not affect normal use by the user, but also reduces power consumption of the electronic device and improves user experience.

In another possible implementation, memory occupied by the first positioning algorithm is greater than memory occupied by the second positioning algorithm.

Specifically, the first positioning algorithm may include the following several features: Kalman filtering, a least square method, a satellite location, ephemeris resolution, an assisted global positioning system (Assisted Global Positioning System, AGPS), and a National Marine Electronics Association (National Marine Electronics Association, NMEA) protocol.

Specifically, the second positioning algorithm may include the following several features: Kalman filtering, a least square method, and a satellite location.

The second positioning algorithm provided in this embodiment of this application is stored in the MCU, and can save storage space in the MCU compared with the first positioning algorithm. In addition, accuracy for processing the GPS data can be ensured by using the second positioning algorithm, to ensure that an accurate track is recorded and presented to the user.

According to a fourth aspect, an embodiment of this application provides another exercise track recording method. The method is applied to a micro control unit MCU. The MCU is connected to a GPS chip, and the MCU is further connected to an application processor. The method includes: receiving GPS data sent by the GPS chip; processing the GPS data by using a positioning algorithm; storing processed GPS data of at least two location points; and when a condition is met, sending the processed GPS data of the at least two location points to the application processor.

Specifically, the GPS data is longitude and latitude corresponding to one location point.

In the exercise track recording method provided in this embodiment of this application, a plurality of pieces of GPS data reported by the GPS chip may be received, and the plurality of pieces of GPS data may be processed by using the positioning algorithm, and then a plurality of pieces of processed GPS data is reported to the application processor in batches, so that the application processor does not need to remain in a wake-up state in an exercise track recording process. In other words, the application processor may be in a sleep state in the exercise track recording process. This reduces power consumption in the exercise track recording process, and improves battery endurance of the electronic device.

In a possible implementation, the condition is any one of the following: the processed GPS data of the at least two location points reaches a threshold, and it is determined, based on the processed GPS data of the at least two location points, that a next-time wake-up condition of the application processor is met.

Possibly, that the processed GPS data of the at least two location points reaches a threshold includes: memory occupied by the processed GPS data of the at least two location points reaches the threshold.

Specifically, the threshold of the memory may be but is not limited to 10 kb, 20 kb, 25 kb, or the like.

Possibly, that the processed GPS data of the at least two location points reaches a threshold includes: duration for storing the processed GPS data of the at least two location points reaches the threshold.

Specifically, the threshold of the duration may be but is not limited to 1 minute, 3 minutes, 5 minutes, or the like.

In another possible implementation, the next-time wake-up condition of the application processor is determined based on a voice broadcast condition set by a user.

Possibly, the voice broadcast condition set by the user is that broadcast is performed at a fixed exercise distance interval, and the next-time wake-up condition of the application processor is that a difference between a current exercise distance and an exercise distance for next voice broadcast is a first distance, where the exercise distance for the next voice broadcast is longer than the current exercise distance.

Specifically, the first distance may be, for example, but is not limited to 0.05 km, 0.1 km, or 0.2 km.

Possibly, the voice broadcast condition set by the user is that broadcast is performed at a fixed time interval, and the next-time wake-up condition of the application processor is that a difference between a current moment and a moment for next voice broadcast is first duration, where the moment for the next voice broadcast is later than the current moment.

Specifically, the first duration may be but is not limited to 5 seconds, 10 seconds, or the like.

In this embodiment of this application, in the exercise track recording process, the voice broadcast is used as a condition for waking up the application processor, to ensure that the application processor is woken up in advance to perform the voice broadcast in time. This does not affect normal use by the user, but also reduces power consumption of the electronic device and improves user experience.

According to a fifth aspect, an embodiment of this application provides an electronic device, including one or more processors, a memory, and a wireless communications module. The memory and the wireless communications module are coupled to the one or more processors, and the memory is configured to store computer program code. The computer program code includes computer instructions. When the one or more processors execute the computer instructions, the electronic device performs the exercise track recording method provided in any one of the third aspect or the implementations of the third aspect.

According to a sixth aspect, an embodiment of this application provides a computer storage medium, including computer instructions. When the computer instructions are run on an electronic device, the electronic device is enabled to perform the exercise track recording method provided in any one of the third aspect or the implementations of the third aspect.

According to a seventh aspect, an embodiment of this application provides a computer program product. When the computer program product runs on a computer, the computer is enabled to perform the exercise track recording method provided in any one of the third aspect or the implementations of the third aspect.

According to an eighth aspect, an embodiment of this application provides a computer storage medium, including computer instructions. When the computer instructions are run on an electronic device, the electronic device is enabled to perform the exercise track recording method provided in any one of the fourth aspect or the implementations of the fourth aspect.

According to a ninth aspect, an embodiment of this application provides a computer program product. When the computer program product runs on a computer, the computer is enabled to perform the exercise track recording method provided in any one of the fourth aspect or the implementations of the fourth aspect.

It may be understood that the electronic device provided in the fifth aspect, the computer storage medium provided in the sixth aspect, or the computer program product provided in the seventh aspect are all configured to perform the exercise track recording method provided in the third aspect. Therefore, for beneficial effects that can be achieved, refer to the beneficial effects in the corresponding method. Details are not described herein again.

It may be understood that the computer storage medium provided in the eighth aspect or the computer program product provided in the ninth aspect are both configured to perform the exercise track recording method provided in the fourth aspect. Therefore, for beneficial effects that can be achieved, refer to the beneficial effects in the corresponding method. Details are not described herein again.

DESCRIPTION OF EMBODIMENTS

The following clearly describes the technical solutions in the embodiments of this application in detail with reference to the accompanying drawings.

Figure 1:
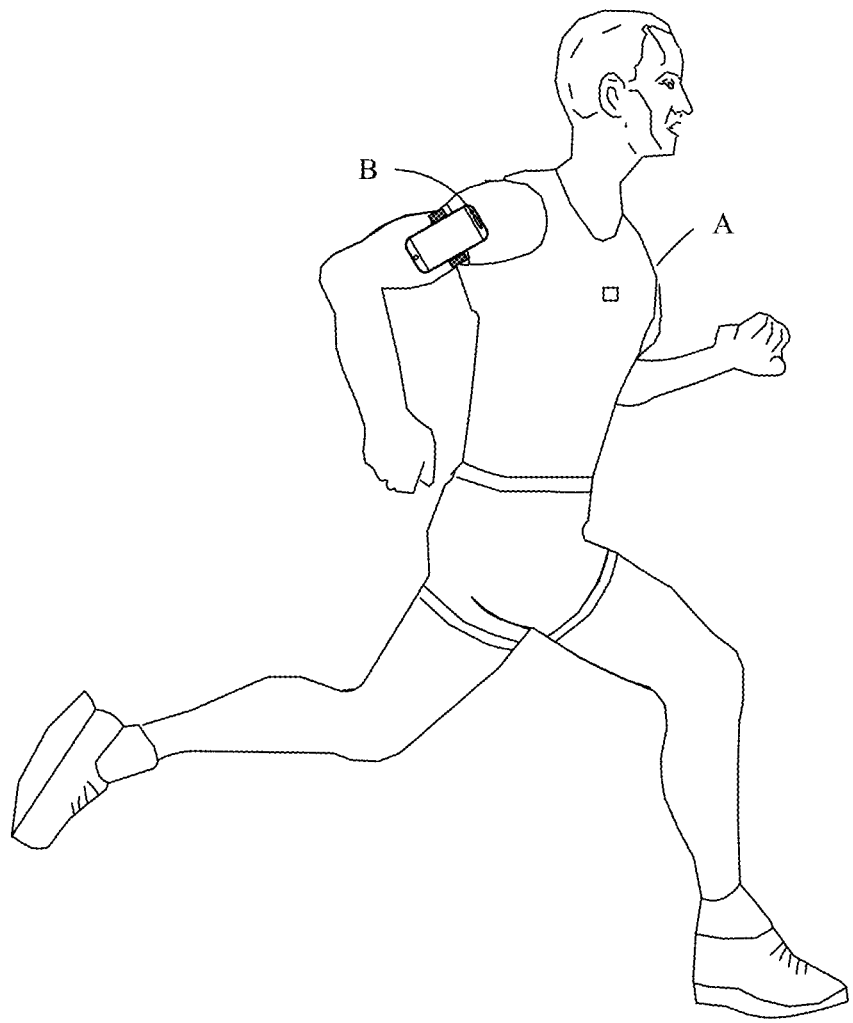
FIG. 1 is a schematic diagram of an application scenario according to an embodiment of this application.

An embodiment of this application provides an exercise track recording method. As shown in FIG. 1, a user A may carry an electronic device B during an outdoor exercise, where exercise-related software (for example, a Huawei Health app) may be installed on the electronic device B. The user A starts the Huawei Health app during the exercise, and may use the electronic device B to record a track of the user A during the exercise.

Specifically, a GPS chip of the electronic device B may be connected to a micro control unit (micro control unit, MCU). The MCU stores GPS data sent by the GPS chip, and then sends the GPS data to an application processor in batches. The application processor may display the exercise track of the user B in a user interface of the Huawei Health app for viewing by the user B. This can ensure high GPS positioning accuracy, reduce power consumption in an exercise track recording process, and improve battery endurance of the electronic device.

The exercise-related software is not limited to the Huawei Health app, and may alternatively be an app such as Keep, or Codoonsport in a specific implementation. This is not limited in this embodiment of this application. Subsequent embodiments of this application are described by using the Huawei Health app as an example.

The outdoor exercise may be but is not limited to, an exercise such as outdoor running, cycling, and mountaineering.

The electronic device in this embodiment of this application may be a portable mobile terminal, for example, a mobile phone, a tablet computer, a netbook, a personal digital assistant (Personal Digital Assistant, PDA), a wearable electronic device (such as a smart band or a smartwatch), or a virtual reality device.

The following describes an example of an electronic device provided in the following embodiment of this application.

Figure 2A:
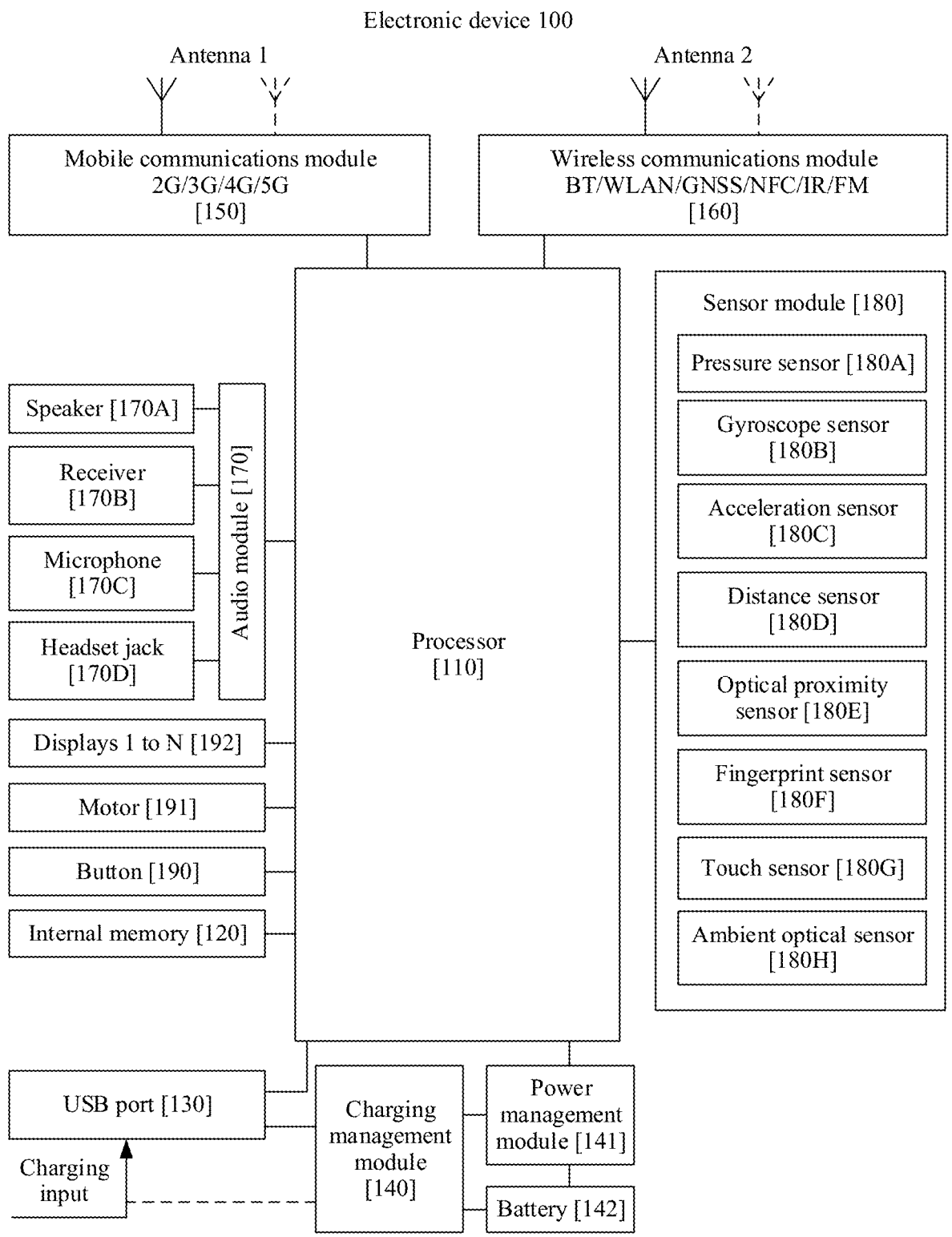
FIG. 2a is a schematic diagram of a structure of an electronic device according to an embodiment of this application.

FIG. 2a is a schematic diagram of a structure of an electronic device 100.

The electronic device 100 may include a processor 110, an internal memory 120, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, a display 192, and the like. The sensor module 180 may include a pressure sensor 180A, a gyroscope sensor 180B, an acceleration sensor 180C, a distance sensor 180D, an optical proximity sensor 180E, a fingerprint sensor 180F, a touch sensor 180G, an ambient optical sensor 180H, and the like.

It may be understood that the structure shown in this embodiment of the present invention does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like and that is applied to the electronic device 100. Specifically, the wireless communications module 160 may include a GPS chip, configured to obtain original GPS data (latitude and longitude) of a current location, to provide a GNSS solution applied to the electronic device 100. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave through the antenna 2 for radiation.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be an MCU, and generate an operation control signal based on instruction operation code and a time sequence signal, to complete control of instruction reading and instruction execution.

Specifically, the MCU may be configured to: receive the original GPS data sent by the GPS chip, process the original GPS data by using a first positioning algorithm, store processed GPS data of at least two location points, and send the processed GPS data of the at least two location points to the application processor.

In an application scenario, the application processor may be configured to receive the processed GPS data of the at least two location points sent by the MCU, and display the processed GPS data in an exercise-related app (for example, a Huawei Health app).

In another application scenario, the application processor may be configured to: receive the original GPS data sent by the GPS chip, process the original GPS data, and display processed GPS data in an exercise-related app (for example, a Huawei Health app).

Specifically, to ensure high accuracy of an exercise track recorded by the electronic device 100, the GPS chip may send the original GPS data to the application processor or the MCU at a frequency of, but not limited to, once per second.

The MCU is not limited to being connected to the GPS chip. In a specific implementation, the MCU may be further connected to various sensors, such as the gyroscope sensor 180B, the acceleration sensor 180C, and the optical proximity sensor 180E, to process data from various sensor devices. This is not limited in this embodiment of this application.

A memory may be further disposed in the processor 110, and is configured to store an instruction and data. In some embodiments, the memory in the processor 110 is a cache. The memory may store an instruction or data that has been used or is cyclically used by the processor 110. If the processor 110 needs to use the instruction or the data again, the processor may directly invoke the instruction or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The USB port 130 is a port that conforms to a USB standard specification, and may be specifically a mini USB port, a micro USB port, a USB type-C port, or the like. The USB port 130 may be used to connect to a charger for charging the electronic device 100, may be used to transmit data between the electronic device 100 and a peripheral device, or may be used to connect to a headset for playing audio through the headset. Alternatively, the port may be used to connect to another electronic device, for example, an AR device.

It may be understood that an interface connection relationship between the modules that is shown in this embodiment of the present invention is merely an example for description, and does not constitute a limitation on a structure of the electronic device 100. In some other embodiments of this application, the electronic device 100 may alternatively use an interface connection manner different from an interface connection manner in this embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect the battery 142 and the charging management module 140 to the processor 110. The power management module 141 receives an input of the battery 142 and/or an input of the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 100 may be configured to cover one or more communication bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave through the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and then transferred to the application processor. The application processor outputs a sound signal by using an audio device (not limited to the speaker 170A, the receiver 170B, and the like), or displays an image or a video on the display 192. In some embodiments, the modem processor may be an independent device. In some other embodiments, the modem processor may be independent of the processor 110, and is disposed in a same device with the mobile communication module 150 or another function module.

The electronic device 100 implements a display function by using the GPU, the display 192, the application processor, and the like. The GPU is a microprocessor for image processing, and is connected to the display 192 and the application processor. The GPU is configured to: perform mathematical and geometric calculation, and render an image. The processor 110 may include one or more GPUs that execute program instructions to generate or change display information.

The display 192 is configured to display an image, a video, and the like. The display 192 includes a display panel. The display panel may be a liquid crystal display (liquid crystal display, LCD), an organic light-emitting diode (organic light-emitting diode, OLED), an active-matrix organic light-emitting diode or an active-matrix organic light-emitting diode (active-matrix organic light-emitting diode, AMOLED), a flexible light-emitting diode (flexible light-emitting diode, FLED), a mini-LED, a micro-LED, a micro-OLED, quantum dot light-emitting diodes (quantum dot light-emitting diodes, QLED), or the like. In some embodiments, the electronic device 100 may include one or N displays 192, where N is a positive integer greater than 1.

The internal memory 120 may be configured to store computer-executable program code, where the executable program code includes instructions. The internal memory 120 may include a program storage area and a data storage area. The program storage area may store an operating system, an application required by at least one function (for example, a sound playing function or an image playing function), and the like. The data storage area may store data (such as audio data and a phone book) created when the electronic device 100 is used, and the like. In addition, the internal memory 120 may include a high speed random access memory, and may further include a nonvolatile memory, for example, at least one magnetic disk storage device, a flash memory device, or a universal flash storage (universal flash storage, UFS). The processor 110 runs the instructions stored in the internal memory 120 and/or the instructions stored in the memory disposed in the processor, to perform various function applications of the electronic device 100 and data processing.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "microphone", is configured to convert a sound signal into an electrical signal. When making a call or sending voice information, a user may make a sound close to the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB port 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 192.

The gyroscope sensor 180B may be configured to determine a motion posture of the electronic device 100. In some embodiments, an angular velocity of the electronic device 100 around three axes (namely, axes X, Y, and Z) may be determined by using the gyroscope sensor 180B. The gyroscope sensor 180B may be configured to implement image stabilization during shooting. For example, when a shutter is pressed, the gyroscope sensor 180B detects an angle at which the electronic device 100 shakes, obtains, through calculation based on the angle, a distance for which a lens module needs to compensate, and allows the lens to cancel the shake of the electronic device 100 through reverse motion, to implement image stabilization. The gyroscope sensor 180B may be further used in a navigation scenario and a motion-sensing game scenario.

The acceleration sensor 180C may detect accelerations in various directions (usually on three axes) of the electronic device 100, and may detect magnitude and a direction of gravity when the electronic device 100 is still. The acceleration sensor 180C may be further configured to recognize a posture of the electronic device, and is used in screen switching between a landscape mode and a portrait mode, a pedometer, or another application.

The distance sensor 180D is configured to measure a distance. The electronic device 100 may measure the distance in an infrared or a laser manner.

For example, the proximity sensor 180E may include a light-emitting diode (LED) and an optical detector, for example, a photodiode. The electronic device 100 may detect, by using the optical proximity sensor 180E, that the user holds the electronic device 100 close to an ear to make a call, to automatically perform screen-off for power saving. The optical proximity sensor 180E may also be used in a smart cover mode or a pocket mode to automatically perform screen unlocking or locking.

The ambient optical sensor 180H is configured to sense ambient light brightness. The electronic device 100 may adaptively adjust brightness of the display 192 based on the sensed ambient light brightness. The ambient optical sensor 180H may further be configured to automatically adjust a white balance during photographing. The ambient optical sensor 180H may also cooperate with the optical proximity sensor 180E to detect whether the electronic device 100 is in a pocket, to avoid an accidental touch.

The fingerprint sensor 180F is configured to collect a fingerprint. The electronic device 100 may use a feature of the collected fingerprint to implement fingerprint-based unlocking, application lock access, fingerprint-based photographing, fingerprint-based call answering, and the like.

The touch sensor 180G is also referred to as a "touch control device". The touch sensor 180G may be disposed on the display 192, and the touch sensor 180G and the display 192 form a touchscreen, which is also referred to as a "touch screen". The touch sensor 180G is configured to detect a touch operation performed on or near the touch sensor 180G. The touch sensor may transfer the detected touch operation to the application processor, to determine a type of a touch event. A visual output related to the touch operation may be provided on the display 192. In some other embodiments, the touch sensor 180G may alternatively be disposed on a surface of the electronic device 100 at a location different from a location of the display 192.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to produce an incoming call vibration prompt and a touch vibration feedback.

A software system of the electronic device 100 may use a layered architecture, an event-driven architecture, a microkernel architecture, a micro service architecture, or a cloud architecture. In the embodiments of the present invention, an Android system of a layered architecture is used as an example to illustrate a software structure of the electronic device 100.

Figure 2B:
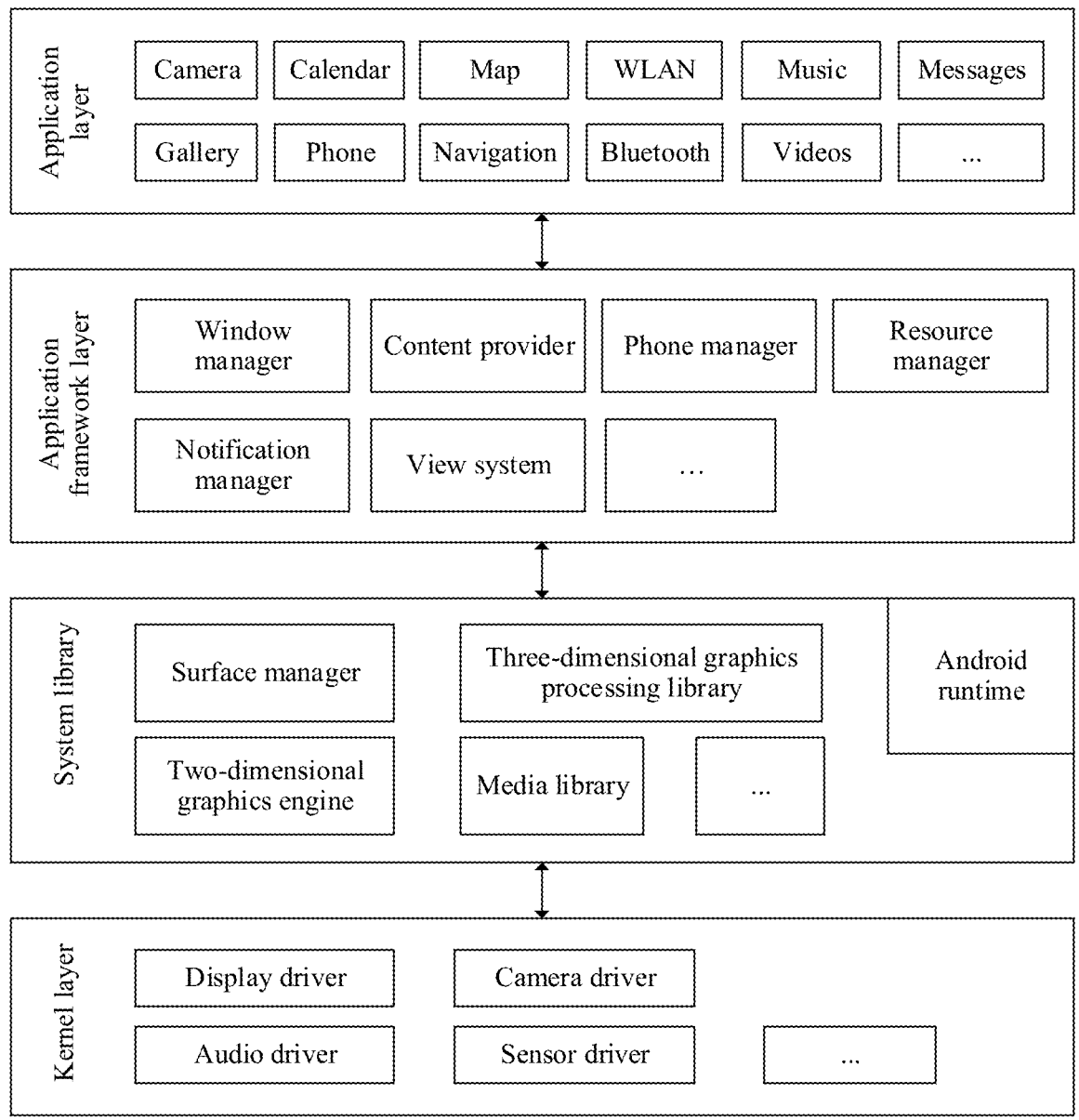
FIG. 2b is a schematic diagram of a software structure of an electronic device according to an embodiment of this application.

FIG. 2*b* is a block diagram of a software structure of an electronic device 100 according to an embodiment of the present invention.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 2*b*, the application packages may include applications such as "Camera", "Gallery", "Calendar", "Phone", "Map", "Navigation", "WLAN", "Bluetooth", "Music", "Videos", and "Messages".

The application framework layer provides an application programming interface (application programming interface, API) and a programming framework for an application at the application layer. The application framework layer includes some predefined functions.

As shown in FIG. 2*b*, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a message notification icon, and may include a text display view and a picture display view.

The phone manager is configured to provide a communication function of the electronic device 100, for example, management of a call status (including answering or declining a call).

The resource manager provides various resources for an application, such as a localized character string, an icon, a picture, a layout file, and a video file.

The notification manager enables an application to display notification information in a status bar, and may be configured to convey a notification type message, where the displayed notification information may automatically disappear after a short pause and require no user interaction. For example, the notification manager is configured to provide notifications of download completing, a message prompt, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an alert sound is played, the electronic device vibrates, or the indicator light blinks.

The Android runtime includes a core library and a virtual machine. The Android runtime is responsible for scheduling and management of the Android system.

The core library includes two parts: a function that needs to be invoked in Java language and a core library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Library), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording of audio and video in a plurality of commonly used formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the electronic device 100 with reference to the outdoor exercise scenario.

When the touch sensor 180G receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a touch and tap operation, and a control corresponding to the tap operation is a "Start exercise" control in a Huawei Health app. The Huawei Health app starts a GPS chip driver by invoking the kernel layer, to obtain GPS data by using the GPS chip.

Application scenarios related to the embodiments of this application are described below.

Figure 3:
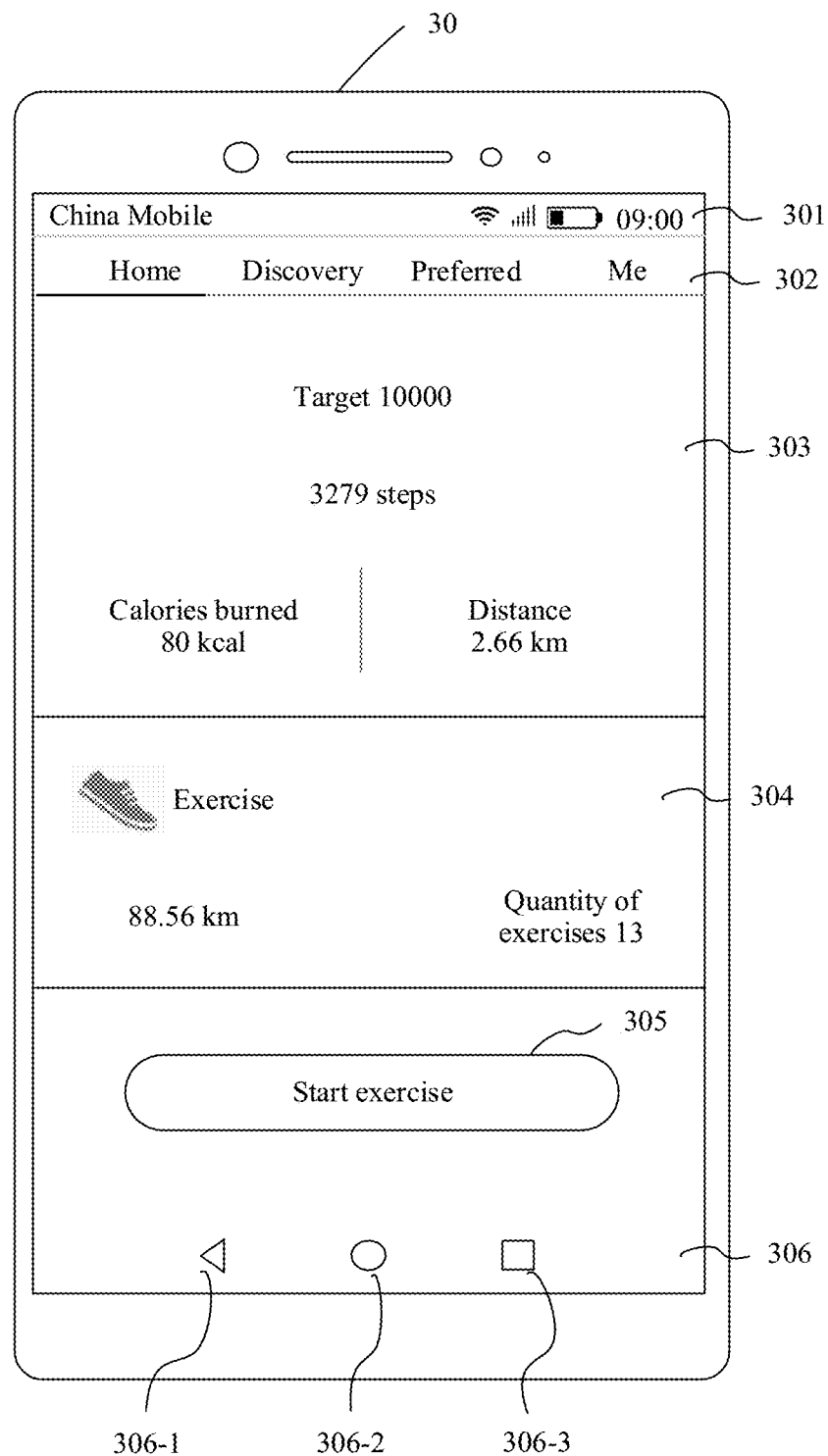
FIG. 3 to FIG. 5 are schematic diagrams of user interfaces according to an embodiment of this application.

FIG. 3 shows an example of a user interface for displaying exercise information. The user interface may be an interface displayed after a user starts a Huawei Health app. The user may tap an icon of the Huawei Health app displayed on a home screen of an electronic device 100 to start the Huawei Health app.

As shown in FIG. 3, the user interface 30 for displaying the exercise information may include a status bar 301, a menu bar 302, a current exercise information display area 303, an accumulated exercise information display area 304, a "Start exercise" control 305, and a navigation bar 306. The status bar 301 may include an operator indicator (for example, an operator name "China Mobile"), one or more signal strength indicators of a wireless high-fidelity (wireless high-fidelity, hi-fi) signal, one or more signal strength indicators of a mobile communication signal (also referred to as a cellular signal), a time indicator, and a battery status indicator.

The menu bar 302 may include four menu controls ("Home", "Discover", "Preferred", and "Me"), and the electronic device 100 displays different content when a different menu is selected. A currently selected menu type shown in FIG. 3 is "Home". That is, content displayed by the electronic device 100 is content displayed after the "Home" menu is selected.

The current exercise information display area 303 may be used to display current exercise information of the user, and may include a target exercise amount (10000 steps), a completed exercise amount (3279 steps), calories burned (80 kcal), and a completed distance (2.66 km). The quantity of steps displayed in the current exercise information display area 303 may be obtained by a gyroscope sensor 180B and an acceleration sensor 180E by detecting a motion posture of the electronic device 100.

The accumulated exercise information display area 304 may be used to display accumulated exercise information of the user, and may include an accumulated exercise distance (88.65 km), an accumulated quantity of exercise times (13), and the like. The accumulated exercise distance displayed in the accumulated exercise information display area 304 may be obtained based on GPS data obtained by a GPS chip 230.

The "Start exercise" control 305 may be used to select an exercise type. The electronic device 100 may detect a touch operation performed on the "Start exercise" control 305 (for example, a tap operation on the "Start exercise" control 305). In response to the operation, the electronic device 100 may display a user interface 40 shown in FIG. 4.

The navigation bar 306 may include system navigation buttons such as a "Back" button 306-1, a "Home (Home screen)" button 306-2, and a "Recent" button 306-3. The home screen is a screen displayed by the electronic device 100 after a user operation performed on the "Home" button 306-2 is detected in any user interface. When detecting that the user taps the "Back" button 306-1, the electronic device 100 may display a previous user interface of a current user interface. When detecting that the user taps the "Home" button 306-2, the electronic device 100 may display the home screen. When detecting that the user taps the "Recent" button 306-3, the electronic device 100 may display a task recently started by the user. The navigation buttons may alternatively have other names. For example, 306-1 may be referred to as a "Back" button, 306-2 may be referred to as a "Home" button, and 306-3 may be referred to as a "Menu" button. This is not limited in this application. The navigation buttons in the navigation bar 306 are not limited to virtual buttons, and may alternatively be implemented as physical buttons.

Figure 4:
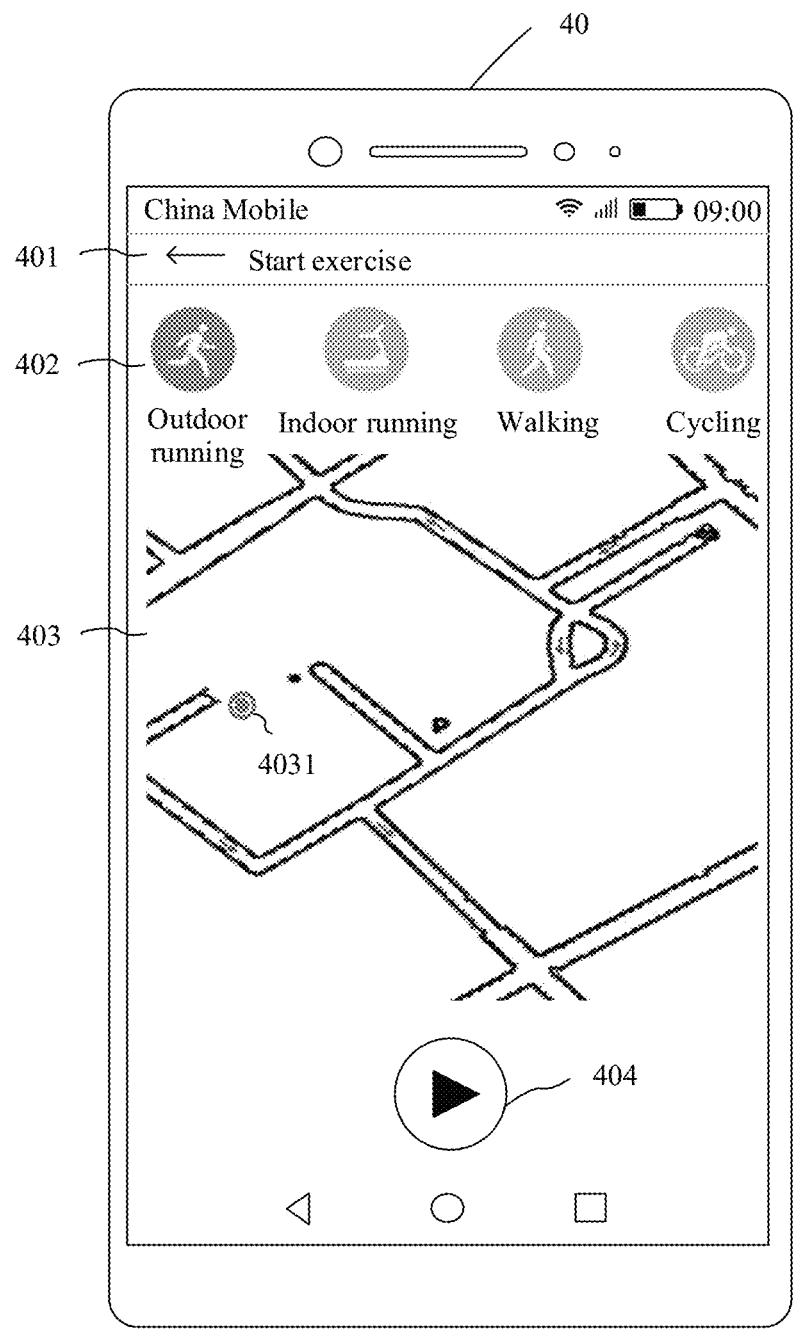

FIG. 4 shows an example of a user interface 40 for selecting an exercise type. As shown in FIG. 4, the user interface 40 may include a status bar, a "Return" control 401, an exercise type option bar 402, a map display area 403, a "Start" control 404, and a navigation bar. The status bar is the same as the status bar 301 in the user interface 30. Details are not described herein again.

The "Return" control 401 may be used to return to a previous user interface. The electronic device 100 may detect a touch operation performed on the "Return" control 401 (for example, a tap operation on the "Return" control 401). In response to the operation, the electronic device 100 may display a previous user interface, namely, the user interface 30.

The exercise type option bar 402 may include four options ("Outdoor running", "Indoor running", "Walking", and "Cycling"). The electronic device 100 may display different content when a different option is selected. A current option shown in FIG. 4 is "Outdoor running", that is, content (the map display area 403) displayed by the electronic device 100 is content displayed after the "Home" menu is selected.

The map display area 403 is used to display a map around a current location of the electronic device 100 and a current location identifier 4031.

The "Start" control 404 is used to start recording exercise information of the user. The electronic device 100 may detect a touch operation performed on the "Start" control 404 (for example, a tap operation on the "Start" control 404). In response to the operation, the electronic device 100 may start recording the exercise information of the user.

The navigation bar is the same as the navigation bar 306 in the user interface 40. Details are not described herein again.

Figure 5:
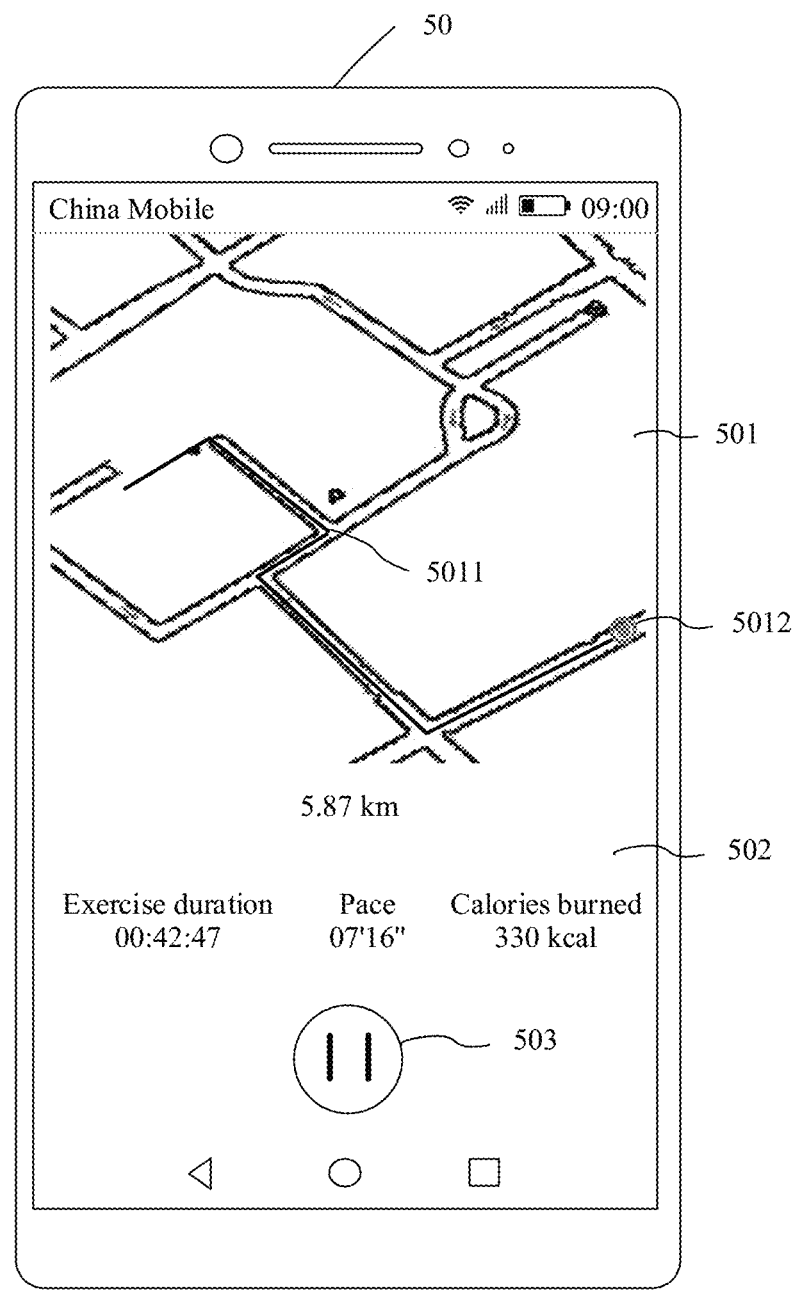

FIG. 5 shows an example of a user interface 50 displayed by the electronic device 100 after the user starts exercise. As shown in FIG. 5, the user interface 50 may include a status bar, a map display area 501, an exercise information display area 502, a "Stop" control 503, and a navigation bar. The status bar is the same as the status bar 301 in the user interface 30. Details are not described herein again.

The map display area 501 is used to display an exercise track 5011 of the user and a current location identifier 5012 of the user.

The exercise information display area 502 is used to display exercise data of a current exercise of the user, including but not limited to an exercise distance (5.87 km), exercise duration (00:42:47), a pace (07'16"), calories burned (330 kcal), and the like.

The "Stop" control 503 is used to stop recording exercise information of the user. The electronic device 100 may detect a touch operation performed on the "Stop" control 503 (for example, a tap operation on the "Stop" control 503). In response to the operation, the electronic device 100 may stop recording exercise information of the user.

The navigation bar is the same as the navigation bar 306 in the user interface 40. Details are not described herein again.

Based on the application scenario shown in FIG. 3 to FIG. 5, the following describes two record modes in the exercise track recording method provided in this application: a low power consumption mode and a normal mode.

The following separately describes a cooperative relationship between components when the electronic device 100 records an exercise track in the two record modes.

Low Power Consumption Mode

Figure 6:
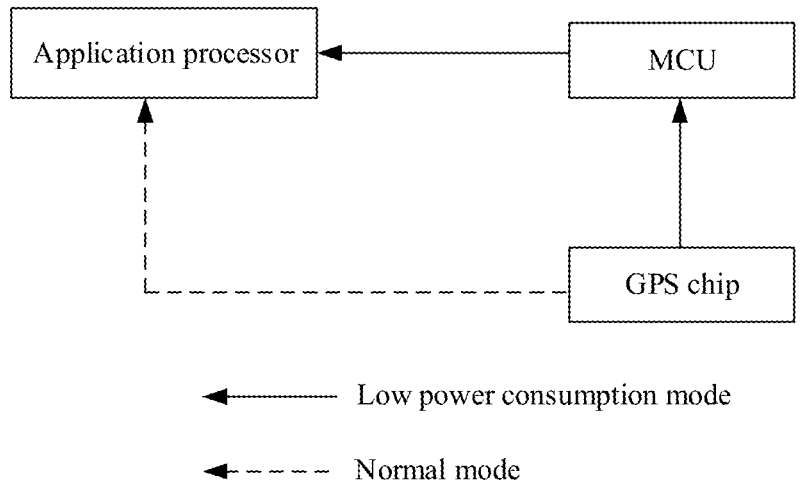
FIG. 6 is a schematic diagram of a connection relationship between components in two record modes according to an embodiment of this application.

A solid line part in FIG. 6 shows a connection relationship between components in the low power consumption mode. As shown in FIG. 6, in this record mode, a GPS chip may be connected to an MCU, and the MCU may be connected to an application processor. The GPS chip sends GPS data to the MCU at a specific frequency. The sending frequency may be, for example, sending one point per second. The GPS data sent by the GPS chip is longitude and latitude data, that is, one piece of GPS data corresponds to longitude and latitude of one location point. The MCU performs first processing on the GPS data by using a simplified positioning algorithm, and stores, in the MCU, processed GPS data obtained after the first processing. When a condition for switching from the low power consumption mode to the normal mode is met, the MCU sends the stored GPS data to the application processor in batches. After receiving the GPS data sent by the MCU, the application processor performs second processing on the GPS data, and displays, in a point form on a map of an exercise app, GPS data obtained after the second processing. The second processing is mainly processing such as noise reduction and smoothing performed on the GPS data obtained after the first processing. After the GPS data is sent in batches, the MCU can clear the stored GPS data to release memory, so as to store GPS data obtained after first processing for a next time in the low power consumption mode. It can be learned that a plurality of points may be connected to form a line, and a line finally displayed on the map of the exercise app is an exercise track of a user. Therefore, the user can view the exercise track of the user on the map. The condition for switching from the low power consumption mode to the normal mode is described in subsequent embodiments. Details are not described herein.

Normal Mode

A dashed line part in FIG. 6 shows a connection relationship between components in the normal mode. As shown in FIG. 6, in this record mode, a GPS chip may be connected to an application processor. The GPS chip sends GPS data to the application processor at a specific frequency. The sending frequency may be, for example, sending one point per second. The GPS data sent by the GPS chip is longitude and latitude data, that is, one piece of GPS data corresponds to longitude and latitude of one location point. The application processor processes the GPS data sent by the GPS chip by using a complete positioning algorithm, and displays processed GPS data in a point form on a map of an exercise app. It can be learned that a plurality of points may be connected to form a line, and a line finally displayed on the map of the exercise app is an exercise track of a user. Therefore, the user can view the exercise track of the user on the map.

The following describes a condition for switching between the two working modes of the electronic device 100 in an exercise track recording process. A condition for switching from the normal mode to the low power consumption mode is first described, and then a condition for switching from the low power consumption mode to the normal mode is described.

1. Condition for Switching from the Normal Mode to the Low Power Consumption Mode In some embodiments, the MCU may trigger the electronic device 100 to switch from the normal mode to the low power consumption mode.

Possibly, after the electronic device 100 detects a touch operation performed on a "Start" control 404, the electronic device 100 records, for the first time, an exercise track of a user in the normal mode in a current exercise track recording process. In this case, the condition for switching from the normal mode to the low power consumption mode is that a display 192 of the electronic device 100 is off.

Possibly, the electronic device 100 records, for a non-first time, an exercise track of a user in the normal mode in a current exercise track recording process. In this case, the condition for switching from the normal mode to the low power consumption mode is that a display 192 of the electronic device 100 is off, the electronic device 100 works in the normal mode for A seconds, and GPS data stored in the low power consumption mode has been sent in batches. A seconds are set, so that the application processor has sufficient time to perform second processing on the GPS data.

Specifically, an MCU may include a timer, and duration of the timer is A seconds. When the MCU starts to send the data to the application processor in batches, the timer may be triggered to start timing. After the timer expires, the MCU may determine that the electronic device 100 works in the normal mode for A seconds.

The A seconds may be but is not limited to 10 seconds, 30 seconds, 60 seconds, or the like.

In some other embodiments, the application processor may trigger the electronic device 100 to switch from the normal mode to the low power consumption mode.

Possibly, after the electronic device 100 detects a touch operation performed on a "Start" control 404, the electronic device 100 records, for the first time, an exercise track of a user in the normal mode in a current exercise track recording process. In this case, the condition for switching from the normal mode to the low power consumption mode is that a display 192 of the electronic device 100 is off. Possibly, the condition for switching from the normal mode to the low power consumption mode may alternatively be that duration for which a display 192 of the electronic device 100 is off reaches preset duration, where the preset duration may be but is not limited to 2 seconds, 3 seconds, 5 seconds, or the like.

Possibly, the electronic device 100 records, for a non-first time, an exercise track of a user in the normal mode in a current exercise track recording process. In this case, the condition for switching from the normal mode to the low power consumption mode may be that a display 192 of the electronic device 100 is off, GPS data stored in the low power consumption mode has been sent in batches, and the application processor has performed second processing on the GPS data.

2. Condition for Switching from the Low Power Consumption Mode to the Normal Mode The condition for switching from the low power consumption mode to the normal mode may include any one of the following: 1. Stored GPS data reaches a threshold B. 2. It is estimated, based on stored GPS data, that a next-time wake-up condition of the application processor is met. 3. A display 192 of the electronic device 100 is on.

For the condition 1, in some embodiments, that the stored GPS data reaches a threshold B may be that duration for storing the GPS data reaches the threshold B, where B may be but is not limited to 1 minute, 3 minutes, 5 minutes, or the like.

In some other embodiments, that the stored GPS data reaches a threshold B may be that memory for storing the GPS data reaches the threshold B, where B may be but is not limited to 10 kb, 20 kb, 25 kb, or the like.

For the condition 2, it can be learned that the application processor is in a sleep state in the low power consumption mode. If a user specifies that voice broadcast is performed when running reaches an integral kilometer during an exercise (content of voice broadcast may be, for example, a current running distance, running duration, and running pace for the latest one kilometer distance), the application processor in the sleep state cannot learn of current exercise data of the user, and cannot perform voice broadcast. In this case, an MCU needs to estimate the current exercise data of the user based on the GPS data sent by a GPS chip, switches to the normal mode before an exercise distance of the user is about to reach an integral kilometer, and wakes up the application processor to perform voice broadcast.

Specifically, if the application processor triggers the electronic device 100 to switch from the normal mode to the low power consumption mode, the application processor may send the next-time wake-up condition to the MCU when the electronic device 100 switches from the normal mode to the low power consumption mode for the first time and when the electronic device 100 switches from the normal mode to the low power consumption mode for a non-first time.

If the MCU triggers the electronic device 100 to switch from the normal mode to the low power consumption mode, when the electronic device 100 switches from the normal mode to the low power consumption mode for the first time, the application processor may send the next-time wake-up condition to the MCU when the display 192 of the electronic device 100 is off. When the electronic device 100 switches from the normal mode to the low power consumption mode for a non-first time, the application processor may send the next-time wake-up condition to the MCU when the GPS data stored by the electronic device 100 in the low power consumption mode has been sent in batches.

The next-time wake-up condition may be determined based on a voice broadcast condition set by the user. The voice broadcast condition set by the user may be, for example, that broadcast is performed at a fixed exercise distance interval or that broadcast is performed at a fixed time interval. A fixed exercise distance may be, for example, but is not limited to an integral kilometer or half of an integral kilometer. The fixed time interval may be, for example, but is not limited to 5 minutes, 10 minutes, or the like.

In some embodiments, the voice broadcast condition set by the user is that broadcast is performed at the fixed exercise distance interval. The next-time wake-up condition of the application processor is that a difference between a current exercise distance and an exercise distance for next voice broadcast is a first distance, where the exercise distance for the next voice broadcast is longer than the current exercise distance.

It is assumed that the user specifies that voice broadcast is performed when the running reaches an integral kilometer during the exercise. When the application processor switches from the normal mode to the low power consumption mode for the first time, a current exercise distance is 0.2 kilometer, and a first distance is 0.1 kilometer, the application processor may send, to the MCU, the next-time wake-up condition that is that an exercise distance reaches 0.7 kilometer. When the MCU in the low power consumption mode estimates that an exercise distance reaches 0.7 kilometer based on the GPS data sent by the GPS chip, the MCU switches to the normal mode and wakes up the application processor. In this case, the application processor may be woken up before an exercise distance reaches 1 kilometer, to perform voice broadcast in time.

When the application processor switches from the normal mode to the low power consumption mode for a non-first time, it is assumed that a current exercise distance is 3.2 kilometers, and a first distance is 0.1 kilometer, the application processor may send to the MCU, the next-time wake-up condition that is continuously keeping exercise for 0.7 kilometer. When the MCU in the low power consumption mode estimates that an exercise distance reaches 0.7 kilometer based on the GPS data sent by the GPS chip, the MCU switches to the normal mode and wakes up the application processor. In this case, the application processor may be woken up before an exercise distance reaches 4 kilometers, to perform voice broadcast in time. The current exercise distance is an exercise distance when the application processor sends the next-time wake-up condition to the MCU.

The first distance is not limited to 0.1 kilometer. In a specific implementation, the first distance may be 0.2 kilometer, 0.05 kilometer, or the like. This is not limited in this embodiment of this application. An advance wake-up distance is set, to avoid a case in which after the application processor is woken up, the application processor misses an actual distance for voice broadcast because the MCU estimates an inaccurate exercise distance by using a first positioning algorithm.

In this application, an actual estimated exercise distance when the application processor is woken up in advance is the foregoing 0.9 kilometer and the foregoing 0.7 kilometer, and may be referred to as a target wake-up exercise distance.

In some other embodiments, the voice broadcast condition set by the user is that broadcast is performed at the fixed time interval. The next-time wake-up condition of the application processor is that a difference between a current moment and a moment for next voice broadcast is first duration, where the moment for the next voice broadcast is later than the current moment.

It is assumed that the user specifies that voice broadcast is performed at the fixed time interval (for example, 5 minutes) during the exercise. An exercise start moment is 9:00:00, a moment at which the application processor sends the next-time wake-up condition to the MCU is 9:02:00, a moment for next voice broadcast is 9:05:00, and the first duration is 5 seconds.

When the application processor switches from the normal mode to the low power consumption mode for the first time, the application processor may send, to the MCU, the next-time wake-up condition that is at 9:04:55. The MCU may trigger, at 9:04:55, the electronic device to switch from the low power consumption mode to the normal mode, so that the application processor may be woken up in advance, to perform voice broadcast in time based on the exercise duration of 5 minutes.

The foregoing example is implemented by using a specific moment (the exercise start moment, the moment in which the application processor sends the next-time wake-up condition to the MCU, and the moment for next voice broadcast), or may be implemented by using duration in a specific implementation.

It is assumed that the user specifies that voice broadcast is performed at the fixed time interval (for example, 5 minutes) during the exercise. When the application processor sends the next-time wake-up condition to the MCU, exercise duration is 1 minute, next voice broadcast is to be performed 3 minutes later, and the first duration is 5 seconds. When the application processor switches from the normal mode to the low power consumption mode for the first time, the application processor may send, to the MCU, the next-time wake-up condition that is continuously keeping exercise for 3 minutes and 55 seconds. The MCU in the low power consumption mode triggers a timer, where duration of the timer is 3 minutes and 55 seconds. After the timer expires, the MCU triggers the electronic device to switch from the low power consumption mode to the normal mode, so that the application processor may be woken up in advance to perform voice broadcast in time based on exercise duration of 5 minutes.

It is assumed that the user specifies that voice broadcast is performed at the fixed time interval (for example 5 minutes) during the exercise. An exercise start moment is 9:00:00, a moment at which the application processor sends the next-time wake-up condition to the MCU is 9:18:00, a moment for next voice broadcast is 9:20:00, and the first duration is 5 seconds. When the application processor switches from the normal mode to the low power consumption mode for a non-first time, the application processor may send, to the MCU, the next-time wake-up condition that is at 9:19:55. The MCU may trigger, at 9:19:55, the electronic device to switch from the low power consumption mode to the normal mode, so that the application processor may be woken up in advance, to perform voice broadcast in time based on exercise duration of 5 minutes.

The foregoing example is implemented by using a specific moment (the exercise start moment, the moment in which the application processor sends the next-time wake-up condition to the MCU, and the moment for next voice broadcast), or may be implemented by using duration in a specific implementation.

It is assumed that the user specifies that voice broadcast is performed at the fixed time interval (for example, 5 minutes) during the exercise. When the application processor sends the next-time wake-up condition to the MCU, exercise duration is 18 minutes, next voice broadcast is to be performed 2 minutes later, and the first duration is 5 seconds. When the application processor switches from the normal mode to the low power consumption mode for a non-first time, the application processor may send, to the MCU, the next-time wake-up condition that is continuously keeping exercise for 1 minute and 55 seconds. The MCU in the low power consumption mode triggers a timer, where duration of the timer is 1 minute and 55 seconds. After the timer expires, the MCU triggers the electronic device to switch from the low power consumption mode to the normal mode, so that the application processor may be woken up in advance to perform voice broadcast in time based on exercise duration of 20 minutes.

In the foregoing examples, the application processor calculates, based on an advance wake-up distance or duration (the first distance or the first duration), a next-time wake-up distance, a next-time wake-up moment, or next-time wake-up duration, and sends the next-time wake-up distance, the next-time wake-up moment, or the next-time wake-up duration to the MCU. In a specific implementation, the application processor may send an actual wake-up distance, an actual wake-up moment, or actual wake-up duration to the MCU, and then the MCU calculates a final wake-up distance or a final wake-up moment based on the advance wake-up distance or duration (the first distance or the first duration), to wake up the application processor.

Due to a limited MCU hardware resource (for example, memory), features included in a simplified positioning algorithm in the MCU are different from features included in a complete positioning algorithm in the application processor. The following describes specific features included in the simplified positioning algorithm and specific features included in the complete positioning algorithm with reference to Table 1.

TABLE 1

Comparison between features included in the simplified positioning algorithm and features included in the complete positioning algorithm

| Feature | Feature description | Complete positioning algorithm | Simplified positioning algorithm |
| --- | --- | --- | --- |
| Kalman filtering | GPS signal processing algorithm | Include | Include |
| Least square method | GPS signal processing algorithm | Include | Include |
| Satellite location | Record a GPS satellite location | Include | Include |
| Ephemeris resolution | Demodulate satellite ephemeris in all channels (a maximum of 144 channels) before successful positioning, to determine a satellite location | Include | Exclude |
| AGPS | Network assisted GPS | Include | Exclude |
| NMEA protocol | GPS data serial port transmission protocol | Include | Exclude |

It can be learned from Table 1 that the simplified positioning algorithm includes features such as Kalman filtering, a least square method, and a satellite location. The Kalman filtering is a prediction algorithm, and may be used to predict an approximate location of a next point, and calibrate the data of the GPS chip.

The least square method is a regression algorithm, and may be used to perform smooth processing on the data of the GPS chip based on a series of data.

The satellite location may be used to record a satellite location. When the electronic device 100 searches for a satellite for the first time, a time for searching for the satellite is shortened. The first search may be, for example, searching for the satellite location when the electronic device 100 is powered on.

The complete positioning algorithm may not only include Kalman filtering, a least square method, and a satellite location, but also include other features such as ephemeris resolution, an assisted global positioning system (Assisted Global Positioning System, AGPS), and a National Marine Electronics Association (National Marine Electronics Association, NMEA) protocol. The ephemeris resolution is used to demodulate satellite ephemeris in all channels (a maximum of 144 channels) before successful positioning, to determine a satellite location.

The AGPS may determine a location of the electronic device 100 based on information about a base station accessed by the electronic device 100, and select the satellite based on the location of the electronic device 100. This reduces time for searching for the satellite.

The NMEA protocol is a GPS data serial port transmission protocol, and is used to export the GPS data.

Figure 7:
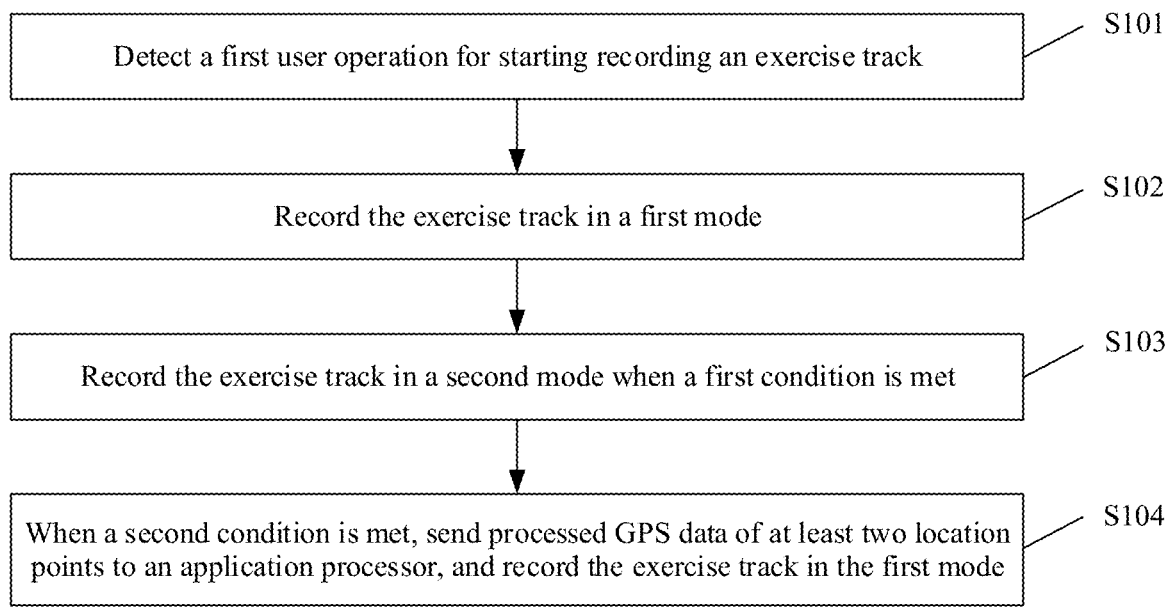
FIG. 7 is a schematic flowchart of an exercise track recording method according to an embodiment of this application.

The following describes an exercise track recording method provided in an embodiment of this application. As shown in FIG. 7, the exercise track recording method may include the following steps.

S101: Detect a first user operation for starting recording an exercise track.

Specifically, the first user operation may be tapping the "Start" control 404 in the embodiment in FIG. 4.

S102: Record the exercise track in a first mode.

Specifically, the first mode is the normal mode mentioned in the foregoing embodiment: A GPS chip is connected to an application processor, and sends GPS data obtained by the GPS chip to the application processor, and the application processor processes, by using a complete positioning algorithm, the GPS data sent by the GPS chip.

S103: Record the exercise track in a second mode when a first condition is met.

Specifically, the second mode is the low power consumption mode mentioned in the foregoing embodiment: The GPS chip is connected to an MCU, and sends the GPS data obtained by the GPS chip to the MCU. The MCU may process the GPS data by using a simplified positioning algorithm, and store processed GPS data of at least two location points.

In some embodiments, the application processor may control an electronic device 100 to record the exercise track in the second mode.

Possibly, the electronic device 100 record the exercise track in the second mode for the first time. The first condition is that a display 192 of the electronic device 100 is off.

Possibly, the electronic device 100 record the exercise track in the second mode for a non-first time. The first condition is that a display 192 of the electronic device 100 is off, the GPS data stored in the low power consumption mode has been sent in batches, and the application processor has performed second processing on the GPS data.

In some other embodiments, the MCU may control an electronic device 100 to record the exercise track in the second mode.

Possibly, the electronic device 100 record the exercise track in the second mode for the first time. The first condition is that a display 192 of the electronic device 100 is off.

Possibly, the electronic device 100 record the exercise track in the second mode for a non-first time. The first condition is that a display 192 of the electronic device 100 is off, the electronic device 100 works in the normal mode for A seconds, and data stored in the low power consumption mode has been sent in batches. A seconds are set, so that the application processor has sufficient time to perform second processing on the GPS data.

S104: When a second condition is met, send the processed GPS data of the at least two location points to the application processor, and record the exercise track in the first mode.

Specifically, the second condition may include any one of the following: 1. Stored data reaches a threshold B. 2. It is estimated, based on the stored data, that a next-time wake-up condition of the application processor is met. 3. The display 192 is on. For details, refer to related descriptions about the condition for switching from the low power consumption mode to the normal mode in the foregoing embodiment. Details are not described herein again.

In this embodiment of this application, the first mode may be the normal mode mentioned in the foregoing embodiment, and the second mode may be the low power consumption mode mentioned in the foregoing embodiment. The first condition may be the condition for switching from the normal mode to the low power consumption mode mentioned in the foregoing embodiment, and the second condition may be the condition for switching from the low power consumption mode to the normal mode mentioned in the foregoing embodiment. The first positioning algorithm may be the complete positioning algorithm mentioned in the foregoing embodiment, and the second positioning algorithm may be the simplified positioning algorithm mentioned in the foregoing embodiment.

In the exercise track recording method provided in this embodiment of this application, the exercise track may be recorded in the two record modes. In the second mode, the MCU may receive the GPS data sent by the GPS chip, process the GPS data, and store a plurality of pieces of processed GPS data. When a switching condition is met, the MCU sends the stored plurality of pieces of processed GPS data to the application processor in batches, so that the application processor enters a sleep state in the second mode. This reduces power consumption and improves battery endurance of the electronic device. In addition, in this application, the MCU is a component having a low power consumption gain. Therefore, the technical solution in this application may be applied to all electronic devices having an MCU, and have a wide application scope.

Figure 8A:
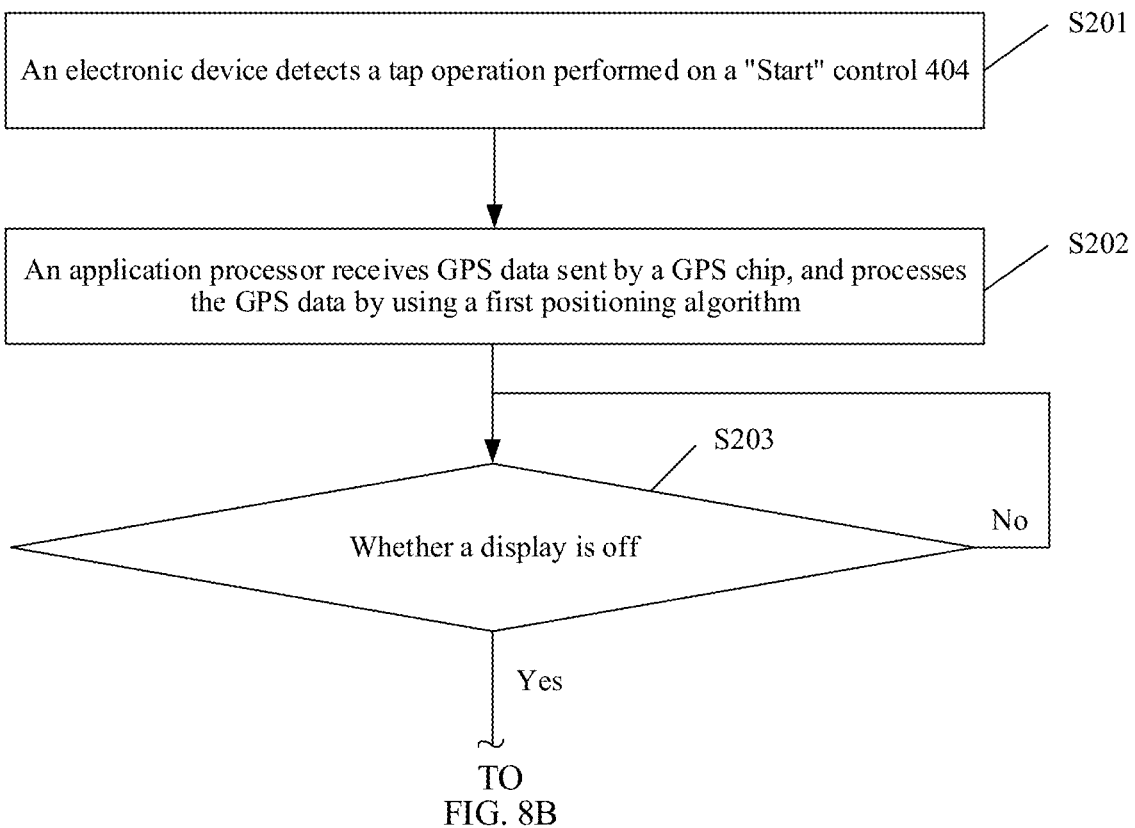
FIG. 8A and FIG. 8B are a schematic flowchart of an exercise track recording method according to another embodiment of this application.
Figure 8B:
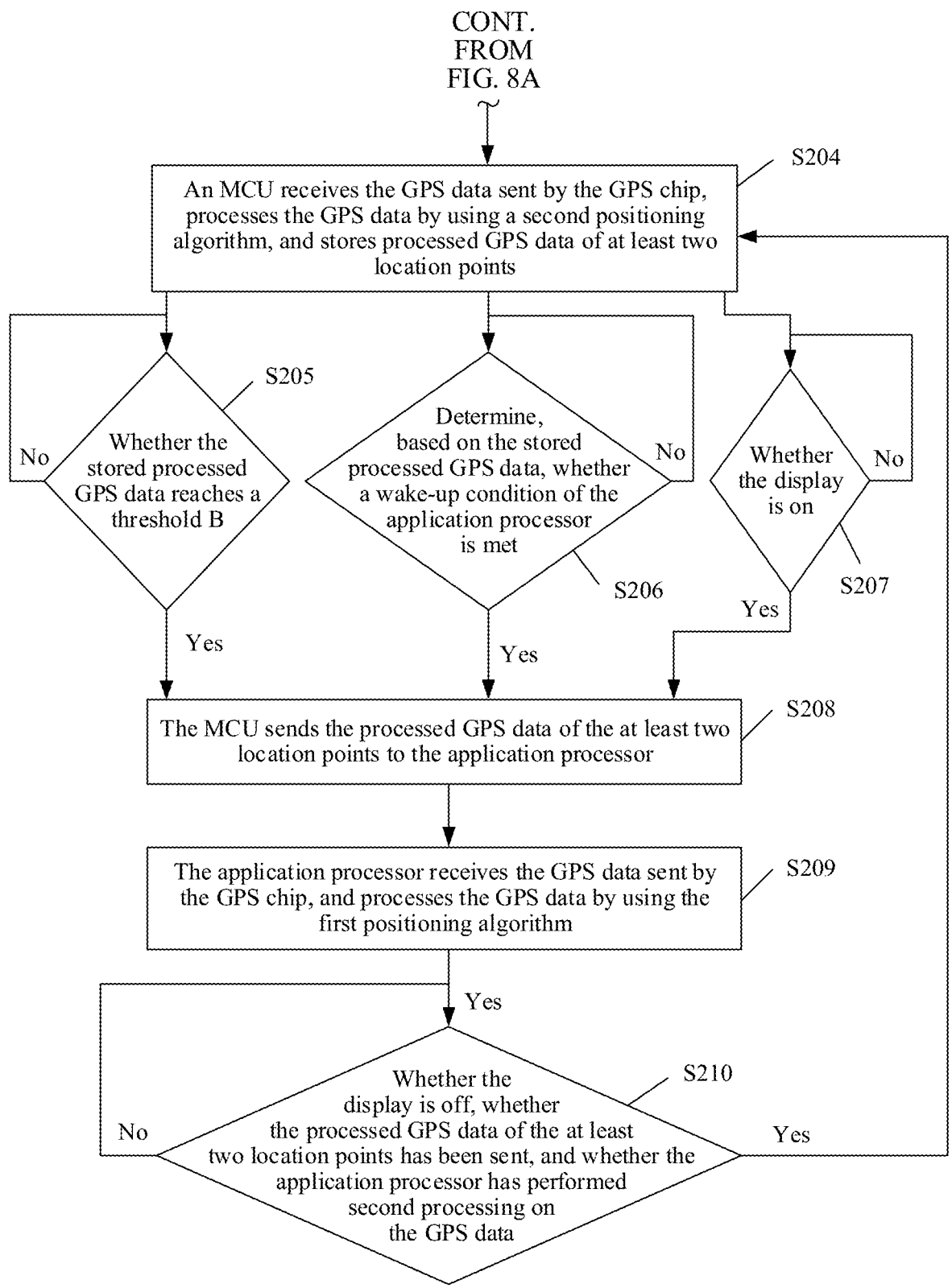

For ease of understanding, an embodiment of this application provides a specific exercise track recording method. As shown in FIG. 8A and FIG. 8B, the exercise track recording method may include the following steps.

S201: An electronic device detects a tap operation performed on a "Start" control 404.

Specifically, after the electronic device detects the tap operation performed on the "Start" control 404, a user starts an outdoor exercise, and the electronic device starts to record an exercise track of the user.

S202: An application processor receives GPS data sent by a GPS chip, and processes the GPS data by using a first positioning algorithm.

Specifically, for features included in the first positioning algorithm, refer to the features included in the complete positioning algorithm listed in Table 1. Details are not described herein again. An initial record mode for recording the exercise track is a first mode. Processed GPS data may be displayed in a point form on a map of an exercise app in real time, so that the user can view the exercise track of the user in real time.

S203: Determine whether a display is off, and perform S204 if the display is off.

Specifically, when the electronic device records the exercise track in the first mode for the first time, the electronic device may determine, based on whether the display is off, whether to record the exercise track in the second mode.

The foregoing step of determining whether to record the exercise track in the second mode may be performed by the application processor.

S204: An MCU receives the GPS data sent by the GPS chip, processes the GPS data by using a second positioning algorithm, and stores processed GPS data of at least two location points.

Specifically, when the exercise track is recorded in the second mode, the GPS chip is connected to the MCU, and sends the GPS data to the MCU. The MCU may process the GPS data by using the second positioning algorithm. For features included in the second positioning algorithm, refer to the features included in the simplified positioning algorithm listed in Table 1. Details are not described herein again. The MCU may store a plurality of pieces of processed GPS data.

S205: Determine whether the stored processed GPS data reaches a threshold B, and perform S208 if the stored processed GPS data reaches the threshold B.

Possibly, the threshold B may be memory for storing the GPS data, and B may be but is not limited to 10 kb, 20 kb, 25 kb, or the like.

Possibly, the threshold B may be duration for storing the GPS data, and B may be but is not limited to 1 minute, 3 minutes, 5 minutes, or the like.

S206: Determine, based on the stored processed GPS data, whether a wake-up condition of the application processor is met, and perform S208 if the wake-up condition of the application processor is met.

Specifically, the wake-up condition of the application processor may be a wake-up condition sent by the application processor to the MCU during switching from a normal mode to a low power consumption mode. The wake-up condition is specifically determined by a voice broadcast condition set by the user. The voice broadcast condition set by the user may be, for example, integral-kilometer broadcast, half-integral-kilometer broadcast, or broadcast at a fixed time interval.

If the voice broadcast condition set by the user is integral-kilometer broadcast, the wake-up condition may be a target wake-up distance that is calculated based on a current exercise distance and at which a next integral-kilometer is reached.

If the voice broadcast condition set by the user is broadcast at a fixed time interval, the wake-up condition may be a target wake-up time that is calculated based on current exercise duration and at which a next broadcast moment is reached.

S207: Determine whether the display is on, and perform S208 if the display is on.

Specifically, after the display is on, the exercise track may be recorded in the first mode, and the exercise track of the user is displayed on the display.

S208: The MCU sends the processed GPS data of the at least two location points to the application processor.

In this case, the application processor of the electronic device is woken up and receives the processed GPS data of the at least two location points that is sent by the MCU, and the exercise track of the user is displayed on the map of the exercise app based on the processed GPS data of the at least two location points.

Specifically, after sending the data to the application processor is completed, the MCU may delete the stored GPS data to release the memory, so as to restore GPS data when the exercise track is recorded in the second mode next time.

S209: The application processor receives the GPS data sent by the GPS chip, and processes the GPS data by using the first positioning algorithm.

Specifically, the electronic device records the exercise track in the first mode for a non-first time.

S210: Determine whether the display is off, whether the processed GPS data of the at least two location points has been sent, and whether the application processor has performed second processing on the GPS data; and perform S204 if the display is off, the processed GPS data of the at least two location points has been sent, and the application processor has performed second processing on the GPS data.

Specifically, when the electronic device records the exercise track in the first mode for the non-first time, the electronic device may determine, based on whether the display is off and whether the data stored in the second mode has been sent, whether to record the exercise track in the second mode. The foregoing step of determining whether to record the exercise track in the second mode may be performed by the application processor.

If the GPS data stored in the second mode has been sent, the exercise track may be recorded in the second mode again, until the electronic device detects a user operation for stopping recording the exercise track.

In this embodiment of this application, the first mode may be the normal mode mentioned in the foregoing embodiment, and the second mode may be the low power consumption mode mentioned in the foregoing embodiment.

In this embodiment of this application, the first positioning algorithm may be the complete positioning algorithm mentioned in the foregoing embodiment, and the second positioning algorithm may be the simplified positioning algorithm mentioned in the foregoing embodiment.

In the exercise track recording method provided in this embodiment of this application, the exercise track may be recorded in the two record modes. In the second mode, the MCU may receive the GPS data sent by the GPS chip, process the GPS data, and store a plurality of pieces of processed GPS data. When a switching condition is met, the MCU sends the stored plurality of pieces of processed GPS data to the application processor in batches, so that the application processor enters a sleep state in the second mode. This reduces power consumption and improves battery endurance of the electronic device. In addition, a switching condition for switching from the second mode to the first mode is set based on the voice broadcast condition set by the user, so that the mode switching is not perceived by the user while power consumption is reduced, and normal use by the user is not affected. In addition, in this application, the MCU is a component having a low power consumption gain. Therefore, the technical solution in this application may be applied to all electronic devices having an MCU, and have a wide application scope.

In a specific embodiment, it is assumed that a current exercise distance of a user is 2.9 km, and the voice broadcast condition set by the user is integral-kilometer broadcast. If the display of the mobile phone is in a screen-on state, and a current record mode is the normal mode, the mobile phone keeps recording the exercise track in the normal mode, and performs voice broadcast when an exercise distance reaches 3 km. If the display of the mobile phone is in a screen-off state, and a current record mode is the low power consumption mode, the mobile phone may wake up the application processor in advance, switch to the normal mode to record the exercise track, and perform voice broadcast in time when an exercise distance reaches 3 km.

Table 2 shows an example of comparison between power consumption in the conventional technology and power consumption in this application in various scenarios. It can be seen that, in the embodiments of this application, power consumption can be reduced by about 50% in various scenarios.

TABLE 2

Comparison table between power consumption in the conventional technology and power consumption in this application in various scenarios

| Scenario | User group | Power consumption in the conventional technology (milliampere) | Power consumption in this application (milliampere) |
|---|---|---|---|
| Running for 1 hour | Occasional exercise user group | 85 | 40 |
| Mountain climbing for 5 hours | Mountaineering and sightseeing user group | 420 | 200 |
| Cycling for 8 hours | Bike riders | 680 | 320 |
| Running for 20 hours | Ultramarathon participants | 1700 | 800 |

Figure 9:
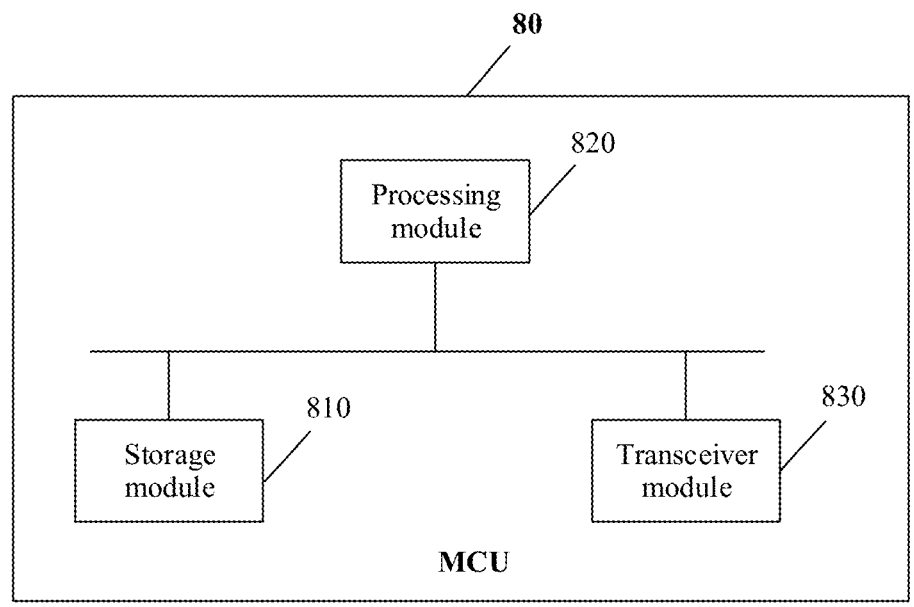
FIG. 9 is a schematic structural diagram of an MCU according to an embodiment of this application.

The following describes a structure of an MCU according to an embodiment of this application. As shown in FIG. 9, the MCU 80 may include at least a storage module 810, a processing module 820, and a transceiver module 830. The storage module 810 and the transceiver module 830 are coupled to the processing module 820.

The storage module 810 is configured to store computer program code, and the computer program code includes computer instructions. The storage module 810 may be further configured to store a positioning algorithm. In this embodiment of this application, the positioning algorithm may be the simplified positioning algorithm mentioned in the foregoing embodiment.

The processing module 820 is configured to invoke the computer instructions in the memory 810, so that the MCU executes the following operations:

receiving, via the transceiver module 830, GPS data sent by a GPS chip;

processing the GPS data via the processing module 820 by using the positioning algorithm;

storing processed GPS data of the at least two location points into the storage module 810; and when a first condition is met, sending, via the transceiver module 830, the processed GPS data of the at least two location points stored in the storage module 810 to an application processor.

In some embodiments, the processing module 810 may be further configured to determine whether a second condition is met, and if the second condition is met, receive, via the transceiver module 830, the GPS data sent by the GPS chip.

In this embodiment of this application, the first condition may be the condition for switching from the low power consumption mode to the normal mode described in the foregoing embodiment, and the second condition may be the condition for switching from the normal mode to the low power consumption mode described in the foregoing embodiment. Details are not described herein again.

Figure 10:
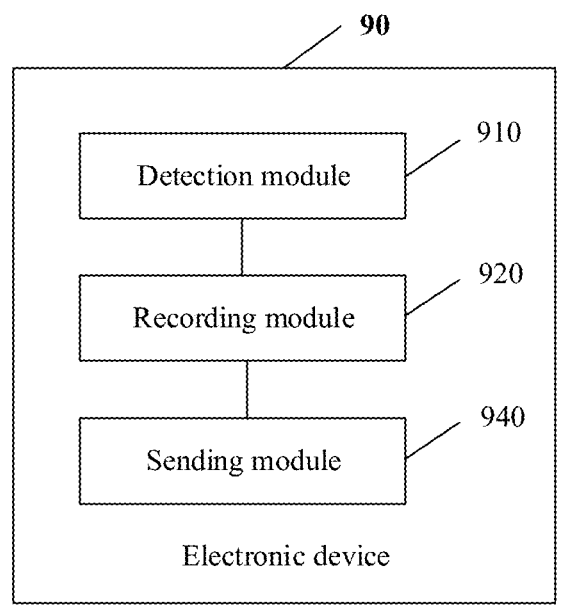
FIG. 10 is a schematic structural diagram of an electronic device according to another embodiment of this application.

The following describes an electronic device according to an embodiment of this application. As shown in FIG. 10, the electronic device 90 may include at least a detection module 910, a recording module 920, and a sending module 930.

The detection module 910 may detect a first user operation used for starting recording an exercise track. For details, refer to the descriptions of S101. Details are not described herein.

In response to the first user operation, the recording module 920 may be configured to record the exercise track in a first mode. For details, refer to the descriptions of S102. Details are not described herein.

The recording module 920 may be further configured to record the exercise track in a second mode when a first condition is met. For details, refer to the descriptions of S103. Details are not described herein.

The sending module 930 may be configured to send stored processed GPS data of at least two location points to an application processor when a second condition is met. For details, refer to the descriptions of S104. Details are not described herein.

The recording module 920 may be further configured to record the exercise track in the first mode when the second condition is met. For details, refer to the descriptions of S104. Details are not described herein.

In this embodiment of this application, the first mode may be the normal mode mentioned in the foregoing embodiment, and the second mode may be the low power consumption mode mentioned in the foregoing embodiment. The first condition may be the condition for switching from the normal mode to the low power consumption mode mentioned in the foregoing embodiment, and the second condition may be the condition for switching from the low power consumption mode to the normal mode mentioned in the foregoing embodiment.

Not only GPS data obtained by a GPS chip is sent to an MCU, but also sound data collected by a codec chip may be sent to a DSP. The DSP stores at least two pieces of sound data and sends the at least two pieces of sound data to the application processor. The application processor is configured to detect a sound signal in a sleep process of a user, such as a snoring sound, a sleep talk sound, or a turning over sound. The sound signal is collected in this manner, to prevent the application processor from continuously receiving the sound data reported by the codec chip. The application processor may be in a sleep state in a process in which the DSP stores the at least two pieces of sound data, to reduce power consumption caused by the application processor, and improve battery endurance of the electronic device.

An embodiment of this application further provides a computer-readable storage medium. The computer-readable storage medium stores instructions. When the instructions are run on a computer or a processor, the computer or the processor is enabled to perform one or more steps according to any one of the foregoing methods. When component modules of the signal processing apparatus are implemented in a form of software function units and sold or used as independent products, the component modules may be stored in the computer-readable storage medium.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of this application are generated. The computer may be a general-purpose computer, a dedicated computer, a computer network, or other programmable apparatuses. The computer instructions may be stored in a computer-readable storage medium, or may be transmitted by using a computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

A person of ordinary skill in the art may understand that all or some of the procedures of the methods in the embodiments may be implemented by a computer program instructing relevant hardware. The program may be stored in a computer-readable storage medium. When the program is executed, the procedures of the methods in the embodiments may be performed. The foregoing storage medium includes any medium that can store program code, such as a ROM, a random access memory RAM, a magnetic disk, or an optical disk.

What is claimed is:

1. A micro control unit (MCU), comprising:
   a non-transitory memory storing instructions;
   a transceiver; and
   at least one processor coupled to the computer-readable media and to the transceiver, the at least one processor configured, upon execution of the instructions, to perform the following steps:
   receiving, via the transceiver, global positioning system (GPS) data sent by a GPS chip;
   processing the GPS data using a positioning algorithm to produce processed GPS data of at least two location points;
   storing the processed GPS data of at least two location points in the memory; and
   when a condition is met, sending, via the transceiver, the processed GPS data of the at least two location points to an application processor.

2. The MCU according to claim 1, wherein the condition is one of:
   determining the processed GPS data of the at least two location points reaches a threshold; or
   determining, based on the processed GPS data of the at least two location points, that a next-time wake-up condition of the application processor is met.

3. The MCU according to claim 2, wherein the condition is that an amount of memory occupied by the processed GPS data of the at least two location points reaches the threshold.

4. The MCU according to claim 2, wherein the condition is that a duration for storing the processed GPS data of the at least two location points reaches the threshold.

5. The MCU according to claim 2, wherein the condition is that the next-time wake-up condition of the application processor is met, and the next-time wake-up condition of the application processor is determined based on an audio feedback condition set by a user.

6. The MCU according to claim 5, wherein the audio feedback condition set by the user is that feedback is performed at a fixed exercise distance interval, and the next-time wake-up condition of the application processor is that a difference between a current exercise distance and an exercise distance for next audio feedback is a first distance and the exercise distance for the next audio feedback is longer than the current exercise distance.

7. The MCU according to claim 5, wherein the audio feedback condition set by the user is that feedback is performed at a fixed time interval, and the next-time wake-up condition of the application processor is that a difference between a current moment and a moment for next audio feedback is first duration and the moment for the next audio feedback is later than the current moment.

8. An electronic device, comprising:
   an application processor;
   a global positioning system (GPS) chip; and
   a micro control unit (MCU) in communication with the application processor and with the GPS chip, the MCU being configured to:
   receive GPS data sent by the GPS chip;
   process the GPS data using a positioning algorithm;
   store processed GPS data of at least two location points; and
   when a condition is met, send the processed GPS data of the at least two location points to the application processor.

9. The electronic device according to claim 8, wherein the condition is one of:
   determine the processed GPS data of the at least two location points reaches a threshold; or
   determine, based on the processed GPS data of the at least two location points, that a next-time wake-up condition of the application processor is met.

10. The electronic device according to claim 9, wherein the condition is that an amount of memory occupied by the processed GPS data of the at least two location points reaches the threshold.

11. The electronic device according to claim 9, wherein the condition is that a duration for storing the processed GPS data of the at least two location points reaches the threshold.

12. The electronic device according to claim 9, wherein the condition is that the next-time wake-up condition of the application processor is met, and the next-time wake-up condition of the application processor is determined based on an audio feedback condition set by a user.

13. The electronic device according to claim 12, wherein the audio feedback condition set by the user is that feedback is performed at a fixed exercise distance interval, and the next-time wake-up condition of the application processor is that a difference between a current exercise distance and an exercise distance for next audio feedback is a first distance and the exercise distance for the next audio feedback is longer than the current exercise distance.

14. The electronic device according to claim 12, wherein the audio feedback condition set by the user is that feedback is performed at a fixed time interval, and the next-time wake-up condition of the application processor is that a difference between a current moment and a moment for next audio feedback is first duration and the moment for the next audio feedback is later than the current moment.

15. A non-transitory computer readable media storing computer instructions, that configure at least one processor, upon execution of the instructions, to perform the following steps:

receiving GPS data sent by a global positioning system (GPS) chip;

processing the GPS data using a positioning algorithm;

storing processed GPS data of at least two location points; and when a condition is met, sending the processed GPS data of the at least two location points to the application processor.

16. The non-transitory computer readable media according to claim 15, wherein the condition is one of:

determining the processed GPS data of the at least two location points reaches a threshold; or determining, based on the processed GPS data of the at least two location points, that a next-time wake-up condition of the application processor is met.

17. The non-transitory computer readable media according to claim 16, wherein the condition is that an amount of memory occupied by the processed GPS data of the at least two location points reaches the threshold; or wherein the condition is that a duration for storing the processed GPS data of the at least two location points reaches the threshold.

18. The non-transitory computer readable media according to claim 16, wherein the condition is that the next-time wake-up condition of the application processor is met, and the next-time wake-up condition of the application processor is determined based on an audio feedback condition set by a user.

19. The non-transitory computer readable media according to claim 18, wherein the audio feedback condition set by the user is that feedback is performed at a fixed exercise distance interval, and the next-time wake-up condition of the application processor is that a difference between a current exercise distance and an exercise distance for next audio feedback is a first distance and the exercise distance for the next audio feedback is longer than the current exercise distance.

20. The non-transitory computer readable media according to claim 18, wherein the audio feedback condition set by the user is that feedback is performed at a fixed time interval, and the next-time wake-up condition of the application processor is that a difference between a current moment and a moment for next audio feedback is a first duration and the moment for the next audio feedback is later than the current moment.

\* \* \* \* \*